(12) United States Patent
Kato et al.

(10) Patent No.: US 9,100,259 B2
(45) Date of Patent: Aug. 4, 2015

(54) RECEIVING DEVICE, RECEIVING METHOD, AND RECEIVING PROGRAM

(71) Applicant: Sharp Kabushiki Kaisha, Osaka-shi, Osaka (JP)

(72) Inventors: Katsuya Kato, Osaka (JP); Takashi Yoshimoto, Osaka (JP); Ryota Yamada, Osaka (JP); Kozue Yokomakura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/378,654

(22) PCT Filed: Feb. 7, 2013

(86) PCT No.: PCT/JP2013/052812
§ 371 (c)(1),
(2) Date: Aug. 14, 2014

(87) PCT Pub. No.: WO2013/121958
PCT Pub. Date: Aug. 22, 2013

(65) Prior Publication Data
US 2015/0043683 A1 Feb. 12, 2015

(30) Foreign Application Priority Data

Feb. 16, 2012 (JP) .................. 2012-031689

(51) Int. Cl.
*H04L 27/06* (2006.01)
*H04L 27/26* (2006.01)
(Continued)

(52) U.S. Cl.
CPC .......... *H04L 27/2649* (2013.01); *H04L 5/0048* (2013.01); *H04L 25/0206* (2013.01); *H04L 25/022* (2013.01); *H04L 25/0212* (2013.01); *H04L 25/0228* (2013.01)

(58) Field of Classification Search
CPC . H04L 27/2647; H04L 27/2649; H04L 5/006; H04L 25/024; H04L 27/2675; H04L 25/0202; H04L 25/03006; H04L 25/067; H04L 25/08; H04L 25/085; H04L 1/0054; H04W 52/325; H04J 11/0036; H04J 11/0063
USPC ................... 375/340–341, 346–350
See application file for complete search history.

(56) References Cited

U.S. PATENT DOCUMENTS

| | | | |
|---|---|---|---|
| 6,373,888 B1 | 4/2002 | Lindoff | |
| 2008/0113636 A1* | 5/2008 | Kikuchi | ........................ 455/130 |

(Continued)

FOREIGN PATENT DOCUMENTS

| | | |
|---|---|---|
| JP | 2002-527997 A | 8/2002 |
| JP | 2012-044492 A | 3/2012 |

OTHER PUBLICATIONS

Official Communication issued in International Patent Application No. PCT/JP2013/052812, mailed on May 7, 2013.

*Primary Examiner* — Khanh C Tran
(74) *Attorney, Agent, or Firm* — Keating & Bennett, LLP

(57) ABSTRACT

GI removers $b102\text{-}n_R$ remove a GI from received signals. FFT units $b103\text{-}n_R$ apply a time-to-frequency transform to the signals obtained in the GI removers $b102\text{-}n_R$. Demapping units $b104\text{-}n_R$ separate from the obtained frequency-domain signals the received signals of resource elements in which data, a first pilot symbol, and a second pilot symbol were respectively transmitted. Path extractors $b105\text{-}n_R$ use the first pilot symbol to extract effective paths for estimation. Channel estimators $b106\text{-}n_R$ compute first CFR estimation values using the second pilot symbol, compute CIR estimation values by using path location information extracted by the path extractors and the first CFR estimation values, and then convert the CIR estimation values into second CFR estimation values.

13 Claims, 20 Drawing Sheets

(51) Int. Cl.
  *H04L 5/00* (2006.01)
  *H04L 25/02* (2006.01)

(56) References Cited

U.S. PATENT DOCUMENTS

2008/0273621 A1* 11/2008 Manakkal et al. ............ 375/267
2009/0245333 A1* 10/2009 Krishnamoorthi et al. ... 375/219
2011/0096722 A1* 4/2011 Jung .............................. 370/328
2012/0106530 A1* 5/2012 Drugge et al. ................. 370/338
2012/0114080 A1* 5/2012 Karthik et al. ................. 375/340
2013/0215801 A1* 8/2013 Mai et al. ....................... 370/280
2013/0343372 A1* 12/2013 Whinnett ....................... 370/344

* cited by examiner transmitted signal $d_1 = (\begin{array}{cccc} 1 & 1 & 1 & 1 \end{array})^T$ $d_2 = (\begin{array}{cccc} 1 & -1 & 1 & -1 \end{array})^T$ $d_3 = (\begin{array}{cccc} 1 & 1 & 1 & 1 \end{array})^T$ $d_4 = (\begin{array}{cccc} 1 & -1 & 1 & -1 \end{array})^T$ $d_5 = (\begin{array}{cccc} 1 & 1 & -1 & -1 \end{array})^T$ $d_6 = (\begin{array}{cccc} -1 & -1 & 1 & 1 \end{array})^T$ $d_7 = (\begin{array}{cccc} 1 & -1 & -1 & 1 \end{array})^T$ $d_8 = (\begin{array}{cccc} -1 & 1 & 1 & -1 \end{array})^T$

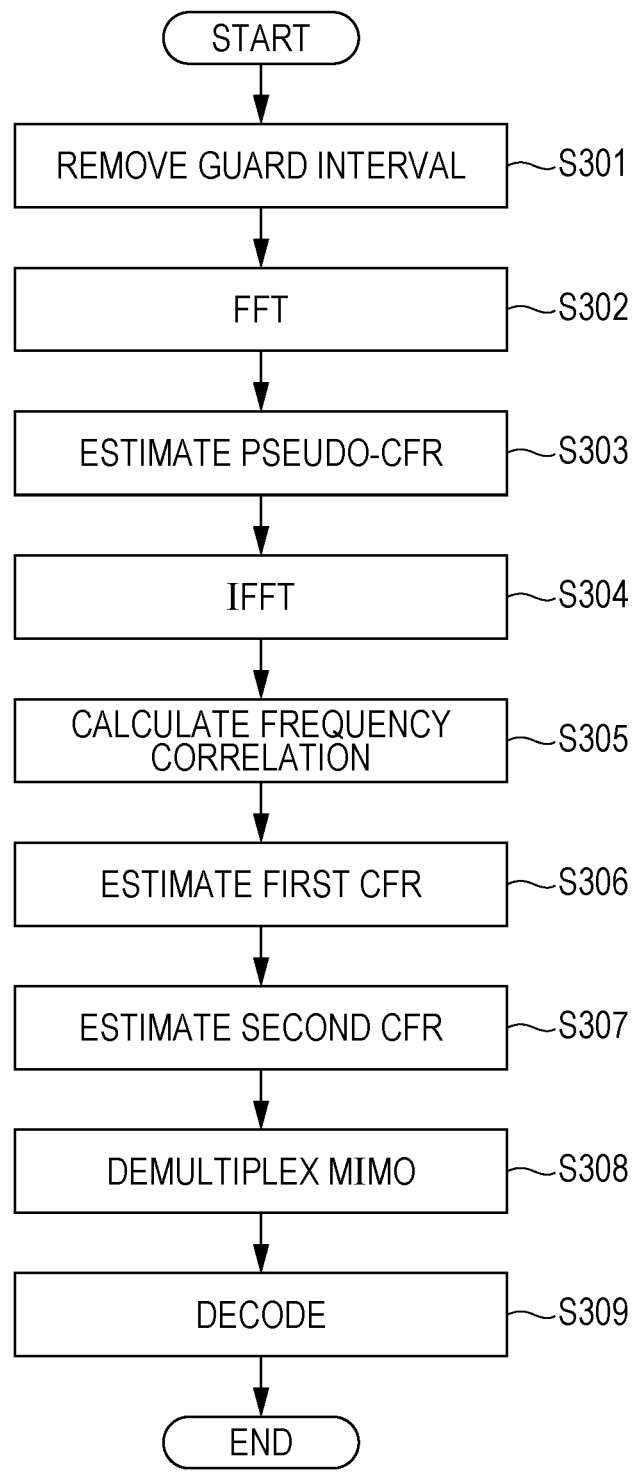

RECEIVING DEVICE, RECEIVING METHOD, AND RECEIVING PROGRAM

TECHNICAL FIELD

The present invention relates to a receiving device, receiving method, and receiving program that conducts channel estimation for demodulation in a radio communication system such as LTE or LTE-A.

BACKGROUND ART

In radio communication, particularly in the case of wideband transmission, there exist paths in addition to a path that arrives in advance, and these paths arrive delayed via reflection off obstacles such as buildings and mountains, for example. An environment in which multiple paths arrive in this way is called a multi-path environment. Recently, orthogonal frequency-division multiplexing (OFDM) is gaining attention as a technique of realizing reliable high-speed transmission in such a multi-path environment, and is being adopted in various fields, including next-generation mobile communication systems such as Long Term Evolution (LTE) and LTE-Advanced (LTE-A), as well as wireless LAN and broadcasting. In the case in which a receiving device demodulates an OFDM signal, it is necessary to conduct channel estimation and compute the channel frequency response (CFR) for each subcarrier. There is a method of realizing this, in which a pilot symbol whose waveform (or alternatively, signal sequence) is stored in advance by the receiving device is transmitted from the transmitting device to the receiving device. Using this pilot symbol to conduct accurate channel estimation requires an accurate power delay profile (PDP).

PTL 1 describes a method of estimating channel impulse response. This method consists of a two-stage process of path extraction and channel impulse response estimation using the extracted path information. In the case of using this technology in OFDM, a time-to-frequency transform is applied to the estimated channel impulse response to convert to a frequency response before use.

CITATION LIST

Patent Literature

PTL 1: Japanese Unexamined Patent Application Publication (Translation of PCT Application) No. 2002-527997

SUMMARY OF INVENTION

Technical Problem

However, in LTE-A, a user-specific demodulation reference signal (DMRS) is used as a reference signal in order to conduct channel estimation for demodulation. Since the reference signal only exists in the band used by a user, there is a problem in that the PDP estimation accuracy is lowered, and as a result, the channel estimation accuracy is also lowered.

The present invention, in light of such circumstances, is an attempt to provide a receiving device, receiving method, and receiving program enabling a significant improvement in the channel estimation accuracy for radio communication.

Solution to Problem

The present invention is a receiving device characterized by receiving a second pilot symbol that is a pilot symbol used for demodulation, and a first pilot symbol that is a different pilot symbol from the second pilot symbol, comprising: a power delay profile configuration unit that uses the first pilot symbol to obtain a power delay profile; and a channel estimator that uses the power delay profile and the second pilot symbol to conduct channel estimation.

The receiving device of the present invention is characterized in that the first pilot symbol and the second pilot symbol are placed into different resources.

Also, the receiving device of the present invention is characterized in that the first pilot symbol and the second pilot symbol have different multiplexing methods in a spatial direction.

Also, the receiving device of the present invention is characterized in that the first pilot symbol and the second pilot symbol are placed into different bandwidths.

Also, the receiving device of the present invention is characterized in that the second pilot symbol is placed into a bandwidth that is narrower that a bandwidth of the first pilot symbol.

Also, the receiving device of the present invention is characterized in that the second pilot symbol is subjected to precoding that is the same as for a data signal.

Also, the receiving device of the present invention is characterized in that the power delay profile configuration unit operates as a path extractor that extracts an effective path to generate path information, and the channel estimator includes: a first frequency response estimator that uses the second pilot symbol to estimate a first frequency response, the first frequency response being a frequency response in a subcarrier in which the second pilot symbol is transmitted; and a channel impulse response estimator that uses the path information and the first frequency response to estimate a channel impulse response.

Also, the receiving device of the present invention is characterized in that the path extractor includes a pseudo-frequency response estimator that uses the first pilot symbol to estimate a pseudo-frequency response, the pseudo-frequency response being a frequency response used for power delay profile measurement, a frequency-to-time transform unit that transforms the pseudo-frequency response to a pseudo-channel impulse response, and a path location extractor that extracts a designated number of paths in order of highest power from among the pseudo-channel impulse response.

Also, the receiving device of the present invention is characterized in that the path extractor repeats a series of processes of adding a candidate path to selected paths and estimating a test channel impulse response, computing a channel match of the test channel impulse response, deleting, from among candidate paths, a candidate path for which the channel match falls below the channel match from before that candidate path was added, and from among the channel matches that were not deleted, selecting a designated number in order of greatest channel match, and selecting the corresponding candidate paths as new selected paths, wherein the series of processes is repeated until the number of candidate paths falls below a designated number.

Also, the receiving device of the present invention is characterized in that the path extractor uses, as the channel match, the sum between a valuation of error between the pseudo-frequency response and a channel estimation value in the case of adding the candidate path, and a penalty on an increase in the number of extracted paths.

Also, the receiving device of the present invention is characterized in that the channel estimator applies a time-to-frequency transform to a channel impulse response output by the channel impulse response estimator, thereby transforming the channel impulse response into a second frequency response that is a frequency response used for demodulation.

Also, the receiving device of the present invention is characterized in that the power delay profile configuration unit operates as an interval extractor that includes the pseudo-frequency response estimator, the frequency-to-time transform unit, and a path/interval converter that computes a power of the pseudo-channel impulse response output by the frequency-to-time transform unit, converts that power into a power delay profile, and computes a frequency correlation, and the channel estimator uses the first frequency response and the frequency correlation to compute a second frequency response that is a frequency response used for demodulation.

Also, the present invention is a receiving method characterized by receiving a second pilot symbol that is a pilot symbol used for demodulation, and a first pilot symbol that is a different pilot symbol from the second pilot symbol, comprising: a power delay profile configuration step that uses the first pilot symbol to obtain a power delay profile; and a channel estimation step that uses the power delay profile and the second pilot symbol to conduct channel estimation.

Also, the present invention is a receiving program for causing a computer to execute the receiving method.

Advantageous Effects of Invention

According to the invention, it is possible to significantly improve channel estimation accuracy, and improve the accuracy of MIMO demultiplexing by using channel estimation values with improved accuracy.

BRIEF DESCRIPTION OF DRAWINGS

FIG. 23 is a flowchart illustrating operations of a receiving device according to the third embodiment.

DESCRIPTION OF EMBODIMENTS

Hereinafter, embodiments of the present invention will be described with reference to the attached drawings.

(First Embodiment)

Figure 1:
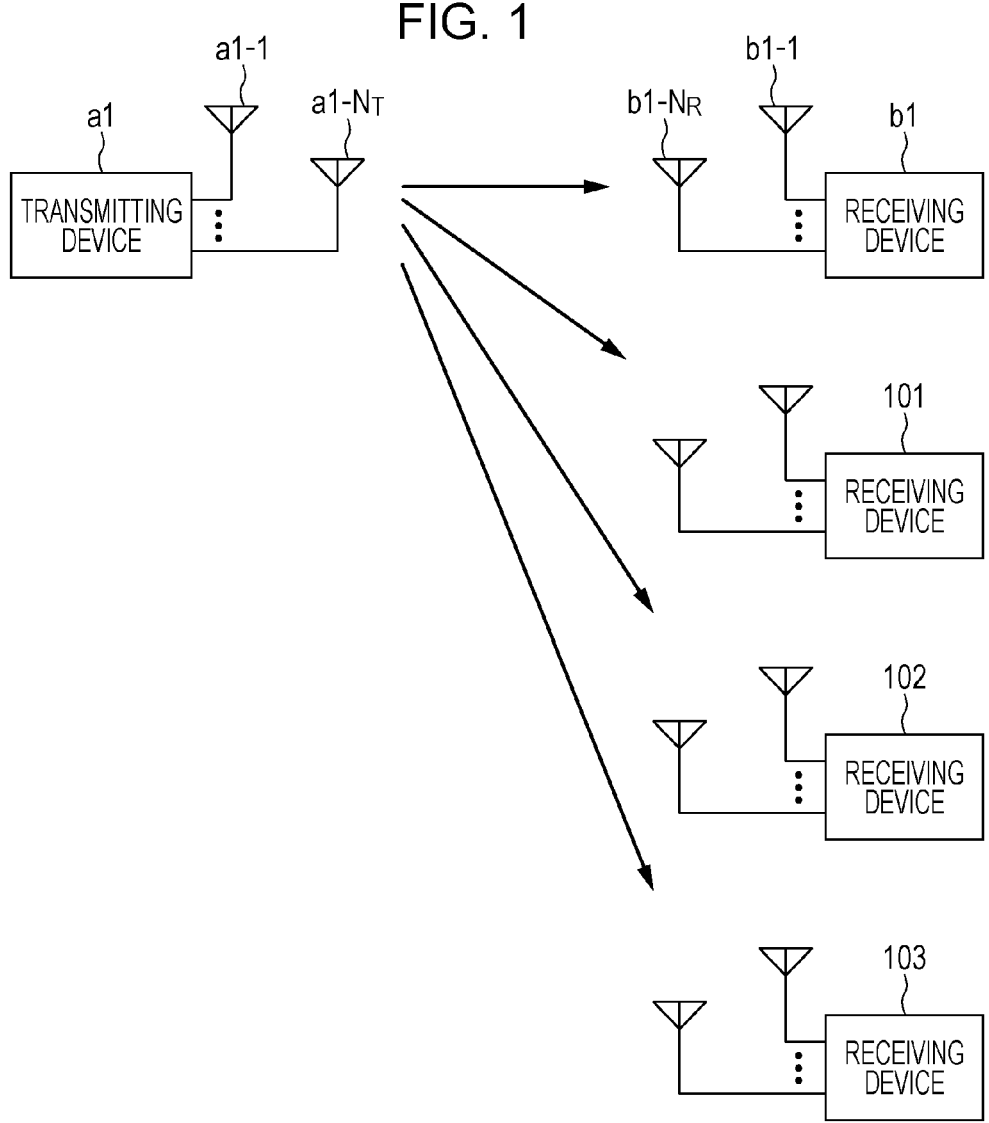
FIG. 1 is a diagram illustrating an overview of a radio communication system according to the first embodiment of the present invention.

FIG. 1 is a diagram illustrating an overview of a radio communication system according to the first embodiment of the present invention.

A radio communication system is equipped with a transmitting device a1, a receiving device b1, and receiving devices 101 to 103. The transmitting device a1 is a base station of a mobile communication system (also called a "base station device"), while the receiving device b1 and the receiving devices 101 to 103 are terminals of that system (also called "terminal devices", "mobile stations", or "mobile station devices"), for example.

Figure 2:
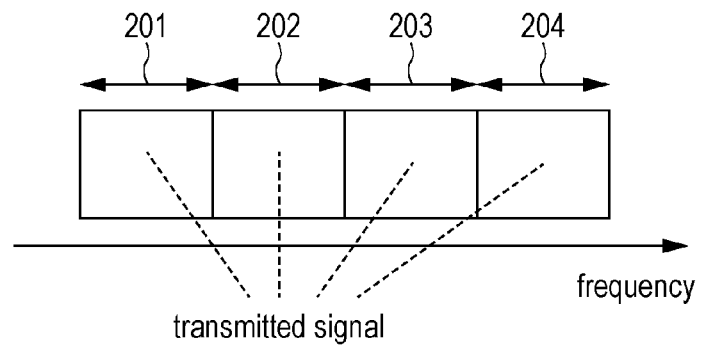
FIG. 2 is a diagram illustrating transmitted signals transmitted by a transmitting device a1.

FIG. 2 illustrates transmitted signals transmitted by the transmitting device a1. A signal transmitted to the receiving device b1 or one of the receiving devices 101 to 103 is allocated to one of the bands 201 to 204. Hereinafter, signal transmitting and receiving from the transmitting device a1 to the receiving device b1 will be described. Also, a signal to the receiving device b1 will be described as using the band 202, but this may also be another band. Note that although the description above describes a case in which there are four receiving devices and the frequency bandwidth is divided into four, this number is arbitrary and may be other than four, such as two or eight, for example.

The transmitting device a1 is equipped with NT transmitting antennas a1-1 to a1-$N_T$, while the receiving device b1 is equipped with $N_R$ receiving antennas b1-1 to b1-$N_R$. Consequently, the radio communication system constitutes $N_T \times N_R$ MIMO, and particularly, $N_T \times N_R$ single-user MIMO. Note that MIMO may be pronounced "my-moh" or "me-moh".

Figure 3:
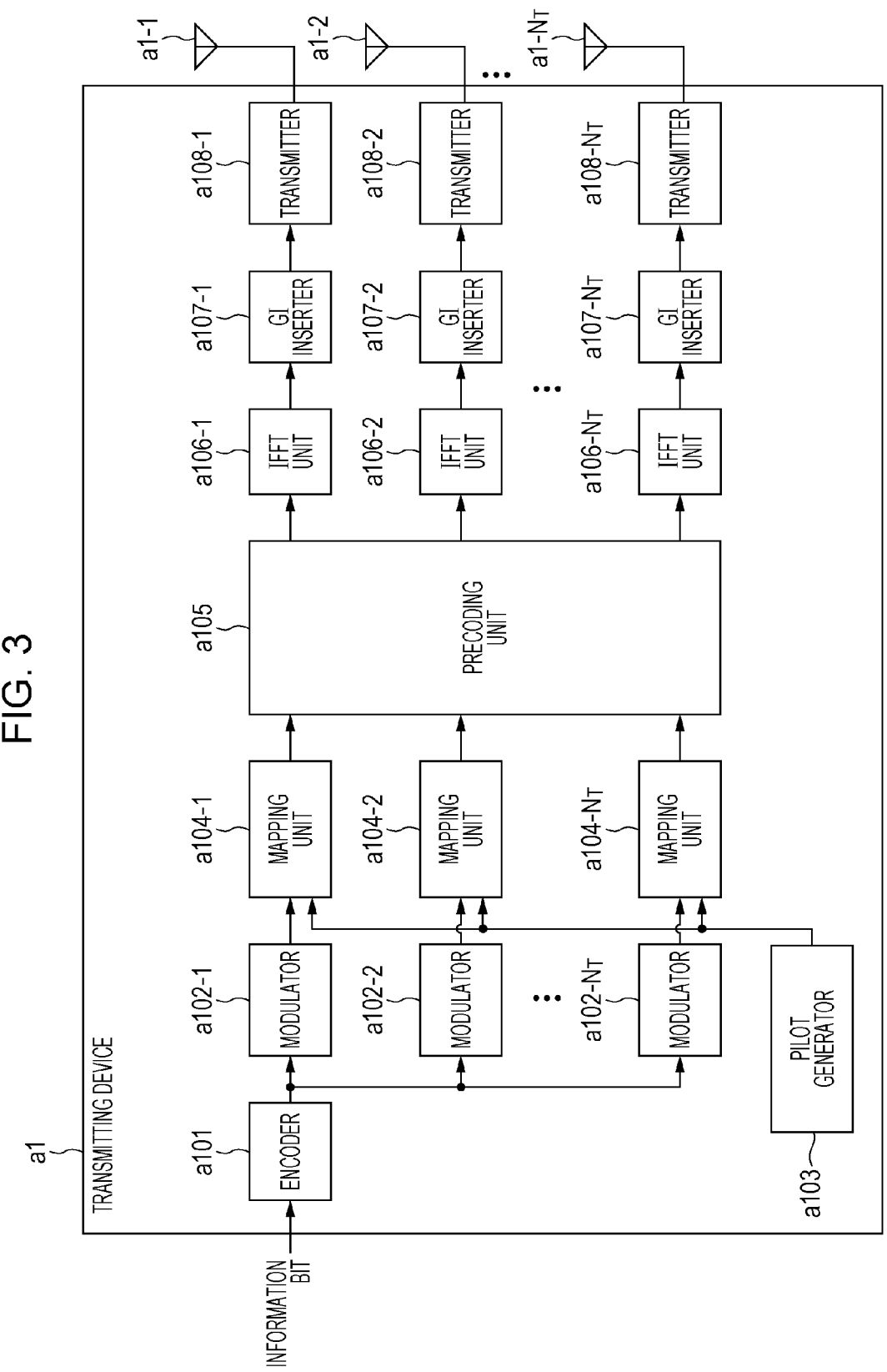
FIG. 3 is a schematic block diagram illustrating a configuration of a transmitting device a1.

FIG. 3 is a schematic block diagram illustrating a configuration of a transmitting device a1.

The transmitting device a1 is configured to include an encoder a101, modulators a102-$n_T$, a pilot generator a103, mapping units a104-$n_T$, a precoding unit a105, inverse fast Fourier transform (IFFT) units a106-$n_T$, guard interval (GI) inserters a107-$n_T$, and transmitters a108-$n_T$. Herein, $n_T$=1, 2, ..., NT. FIG. 3 also illustrates transmitting antennas a1-$n_T$.

The encoder a101 encodes an information bit to transmit to the receiving device b1 by using error-correcting codes such as convolutional codes, turbo codes, and low density parity check (LDPC) codes, and generates an encoded bit. The encoder a101 outputs the generated encoded bit to the modulators a102-$n_T$. In the following, take U to be the number of signal streams to transmit to the receiving device b1. Of the $N_T$ modulators a102-$n_T$, only U are used. Note that herein, U is the number of transmitted streams. Note that U signal sequences may also be generated by a serial-to-parallel conversion of the output from a single modulator.

The modulators a102-$n_T$ modulate an encoded bit input from the encoder a101 by using a modulation scheme such as phase-shift keying (PSK) or quadrature amplitude modulation (QAM), and generate a modulation symbol. The modulators a102-u output generated modulation symbols to the mapping units a104-$n_T$.

The pilot generator a103 generates U pilot symbols as reference signals for the receiving device b1 to conduct channel estimation, and outputs to the mapping units a104-$n_T$. Additionally, the pilot generator a103 also generates reference signals for the receiving devices 101 to 103 to conduct channel estimation. Details will be discussed in conjunction with the mapping units a104-$n_T$.

The mapping units a104-$n_T$ generate a signal in the frequency domain by mapping modulation symbols input from the modulators a102-$n_T$ and pilot symbols input from the pilot generator a103 to resource elements (time-frequency bands) on the basis of predetermined mapping information, and output the generated signals in the frequency domain to the IFFT units (also called frequency-to-time transform units) a106-$n_T$. Note that a resource element is a unit in which to place a modulation symbol, consisting of one subcarrier and one FFT interval, to be discussed later, in a frame transmitted by the transmitting device a1. Also, mapping information is decided by the transmitting device a1 and reported in advance from the transmitting device a1 to the receiving device b1.

The precoding unit a105 precodes modulation symbols and pilot symbols input from the mapping units a104-$n_T$. Note that precoding is not conducted on the CRS. After that, the precoding unit a105 outputs to the IFFT units a106-$n_T$.

The IFFT units a106-$n_T$ apply a frequency-to-time transform to frequency-domain signals input from the precoding unit a105, and generate time-domain signals. Herein, the unit time interval over which the IFFT is applied is designated the FFT interval. The IFFT units a106-$n_T$ outputs the generated time-domain signals to the GI inserters a107-$n_T$.

The GI inserters a107-$n_T$ add a GI to each FFT interval signal in the time-domain signals input from the IFFT units a106-$n_T$. Herein, a GI refers to a duplication of a latter part of an FFT interval signal. The GI may also be a known signal interval using a zero interval, Golay code, or the like. The GI inserters a107-$n_T$ add such a signal before an FFT interval signal.

Note that the FFT interval and the time interval of the GI added to the signal of that time interval by the GI inserters a107-$n_T$ (designated the GI interval) will be collectively designated the OFDM symbol interval. Also, the signal in an OFDM symbol interval will be designated the OFDM symbol.

The GI inserters a107-$n_T$ output the signals with added GIs to the transmitters a108-$n_T$.

Note that a GI may also be inserted after an FFT interval. Additionally, the GI may also be called a cyclic prefix (CP).

The transmitters a108-$n_T$ apply a digital-to-analog (DA) conversion to the signals input from the GI inserters a107-nT, and perform waveform shaping on the converted analog signals. The transmitters a108-$n_T$ upconvert the waveform-shaped signals from the baseband to a radio frequency band, and transmit the upconverted signals from the transmitting antennas a1-$n_T$ to the receiving device b1.

Figure 4:
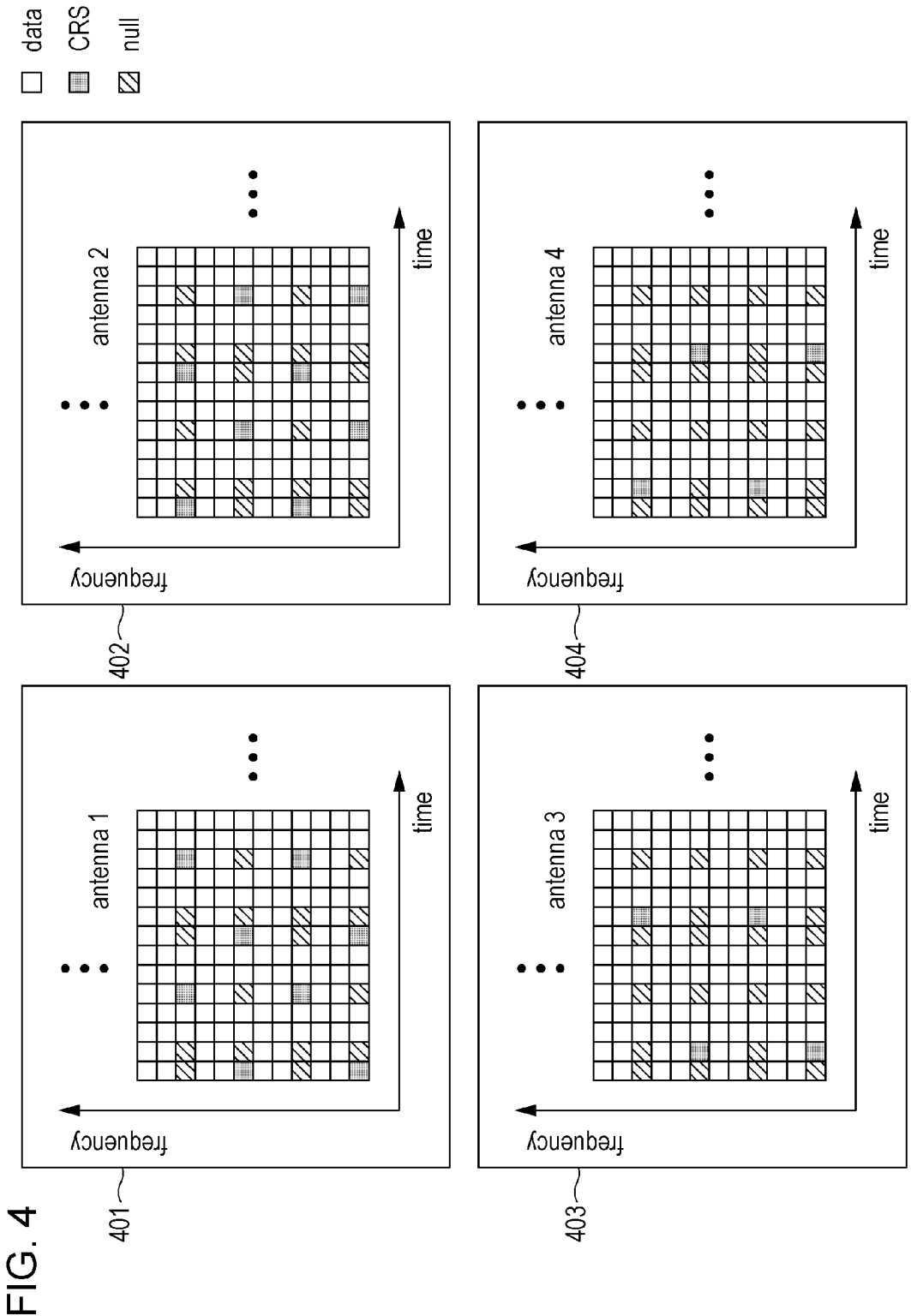
FIG. 4 is a diagram illustrating an example of a mapping unit a104-nT mapping modulation symbols and pilot symbols.

FIG. 4 is an example of the mapping units a104-$n_T$ mapping modulation symbols and pilot symbols, and illustrates a case of inserting the cell-specific reference signal (CRS) in LTE-A or LTE as the pilot symbol. The CRS is a cell-specific pilot symbol, and terminals in the same cell receive the same pilot symbol. A single square represents a resource element, of which 14 are placed in the time direction and 12 are placed in the frequency direction, as demonstrated in each of 401 to 404 of FIG. 4. Herein, a resource element is a unit of a signal transmitted by the transmitting device a1, and consists of one subcarrier on the frequency axis and one symbol interval on the time axis. Note that this unit, in which 14 resource elements are placed in the time direction and 12 resource elements are placed in the frequency direction, is called a subframe. The CRS only supports up to four transmitting antennas, and unlike the DMRS discussed later, precoding is not performed. For this reason, it is not possible for a user conducting demodulation using a demodulation reference signal (DMRS) to use the CRS for channel estimation for such demodulation. Hereinafter, take $N'_T$ to be the number of CRS transmitting antennas.

Figure 5:
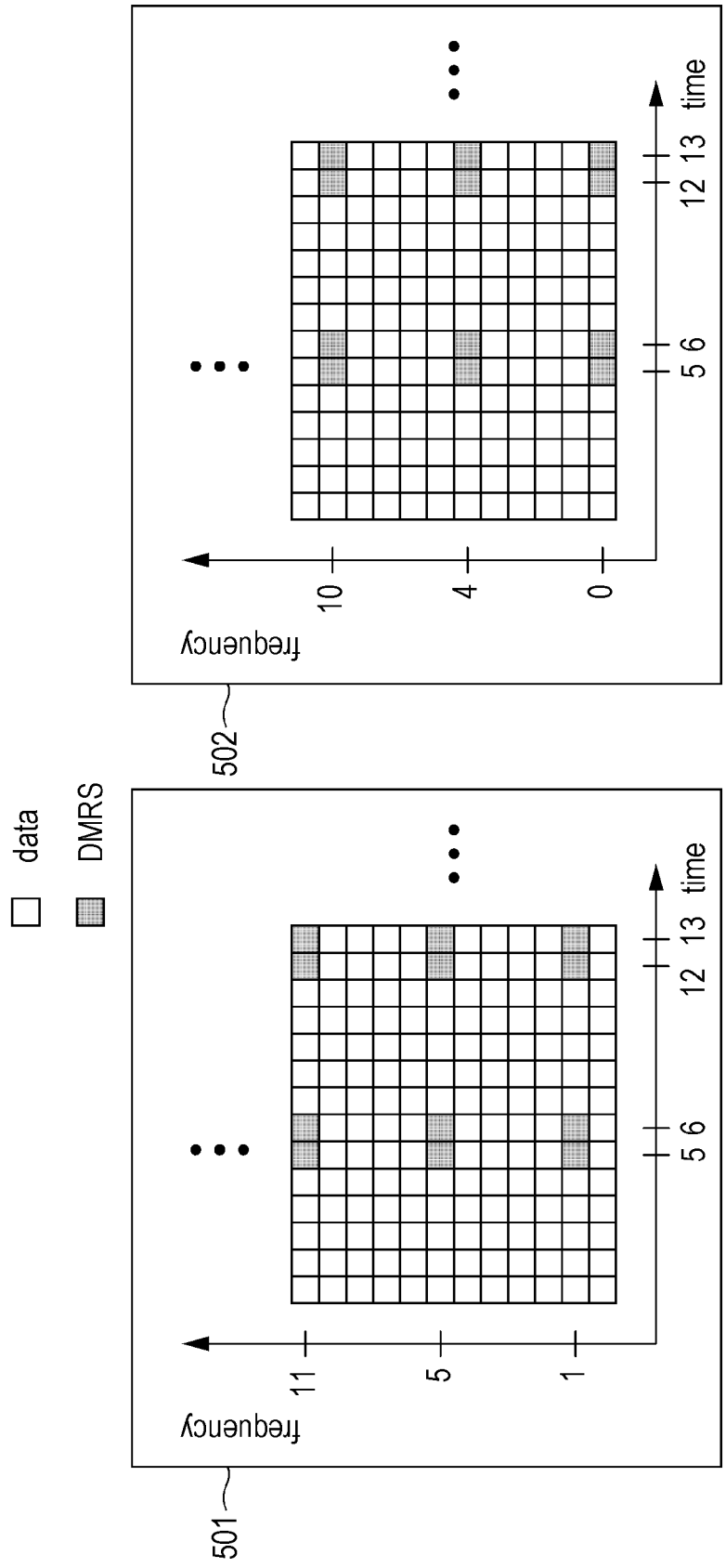
FIG. 5 is an example of a mapping unit a104-nT mapping modulation symbols and pilot symbols.

FIG. 5 is an example of the mapping units a104-$n_T$ mapping modulation symbols and pilot symbols, and illustrates a case of inserting the DMRS in LTE-A as the pilot symbol. Describing 501 of FIG. 5, for each subcarrier in which the DMRS is placed (1, 6, 11), there exist four resource elements in the subframe in which the DMRS may be placed. Into these four resource elements, a maximum of four streams' worth of pilot symbols are inserted by being code-multiplexed after performing precoding. In addition, the insertion pattern in 502 of FIG. 5 is also available, which enables pilot symbols for other streams to be inserted, and thus a maximum of up to eight streams may be multiplexed.

Figure 6:
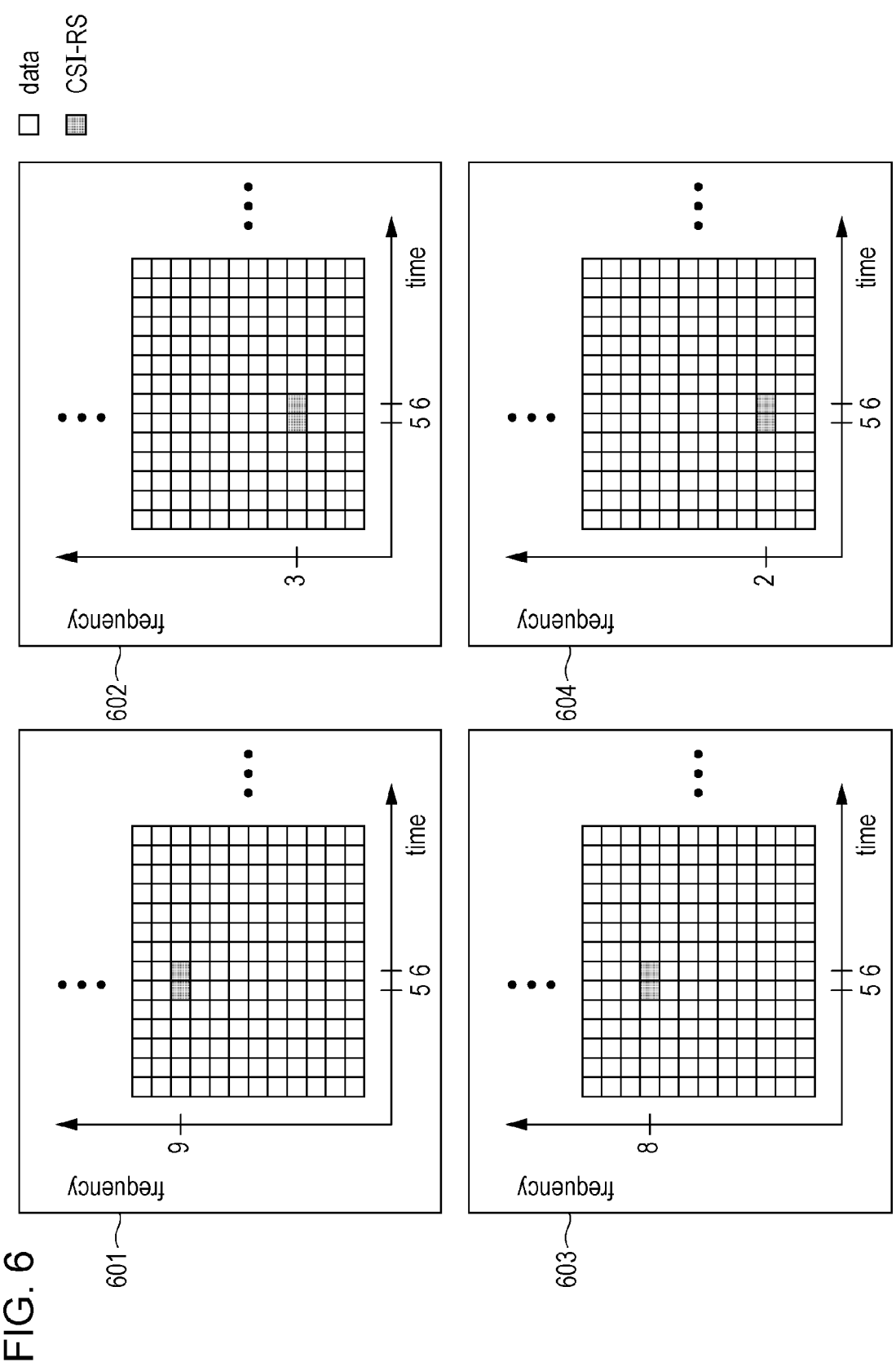
FIG. 6 is a diagram illustrating an example of CSI-RS.

Returning to FIG. 2, the CRS is inserted into all bands from 201 to 204, but the DMRS is only inserted into the allocated band. In other words, the DMRS for the receiving device b1 is only inserted into the band 202. In the following description, a first pilot symbol is used for path location detection, and a second pilot symbol is used as a pilot symbol for estimating channel impulse response. As an example, the present embodiment describes using the CRS for the first pilot symbol, and the DMRS for the second pilot symbol. However, the present invention is not limited thereto, and other pilot placements are also included in the present invention insofar as the first pilot symbol and the second pilot symbol are different. Also, a different placement refers to pilot symbols being placed in different resource elements, such as different frequencies or times. Also, even if the type of pilot symbol is the same, it is possible to differentiate a first pilot symbol and a second pilot symbol. For example, an odd-numbered pilot symbol sequence may be treated as the first pilot symbol, while an even-numbered pilot symbol sequence may be treated as the second pilot symbol sequence. As another example, the first pilot symbol may also be the CSI reference signal (CSI-RS) of LTE-A illustrated FIG. 6 or the like, rather than the CRS. The CSI-RS is a pilot symbol used to feed back the channel state to the base station. FIG. 6 illustrates an example of the CSI-RS. In 601 to 604, a single subframe has two available resource elements in which to place the CSI-RS, so that two streams are code-multiplexed and inserted. Since there are four available subframes, up to eight streams may be inserted. The CSI-RS is inserted into all bands, similarly to the CRS. Also, the pilot symbol is not limited to an LTE-A pilot symbol.

Additionally, although the following describes a case in which a first pilot symbol and a second pilot symbol are inserted into the same subframe, the first pilot symbol and the second pilot symbol may also be inserted into subframes that are respectively different timewise.

Figure 7:
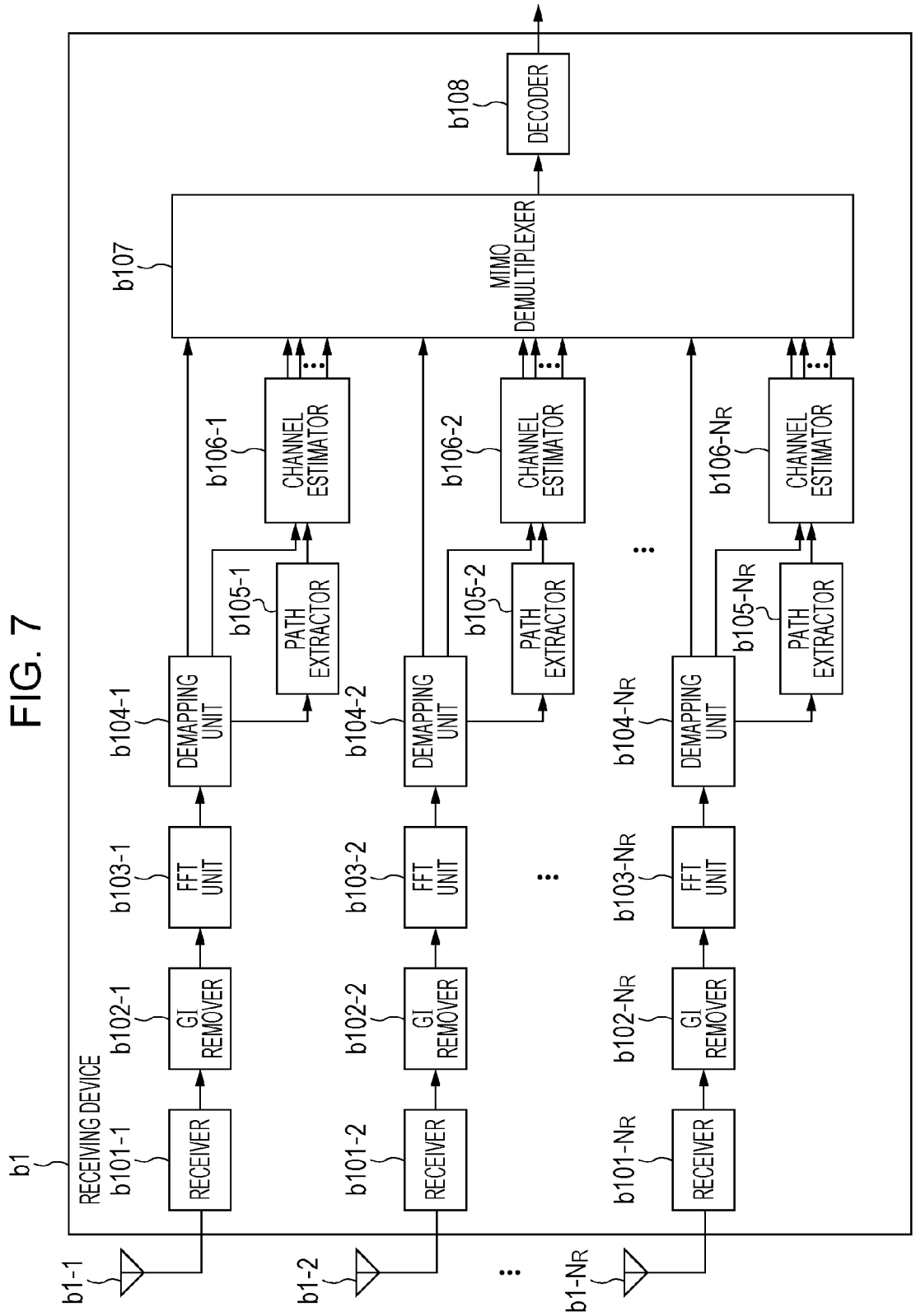
FIG. 7 is a schematic block diagram illustrating a configuration of a receiving device b1 according to the first embodiment.

FIG. 7 is a schematic block diagram illustrating a configuration of a receiving device b1 according to the present embodiment.

In this diagram, the receiving device b1 is configured to include receivers b101-$n_R$, GI removers b102-$n_R$, FFT units (also called time-to-frequency transform units) b103-$n_R$, demapping units b104-$n_R$, path extractors b105-$n_R$, channel estimators b106-$n_R$, a MIMO demultiplexer b107, and a decoder b108. Herein, $n_R$=1, 2, ..., $N_R$. FIG. 7 also illustrates receiving antennas b1-$n_R$.

The receivers b101-$n_R$ receive, via the receiving antennas b1-$n_R$, transmitted signals that were transmitted by the transmitting device a1. The receivers b101-$n_R$ perform frequency conversion and analog-to-digital (AD) conversion on the received signals.

The GI removers b102-$n_R$ remove the GI from the signals input from the receivers b101-$n_R$, and output to the FFT units b103-$n_R$.

The FFT units b103-$n_R$ apply a time-to-frequency transform to the time-domain signals input from the GI removers b102-$n_R$, and output the transformed frequency-domain signals to the demapping units b104-$n_R$.

The demapping units b104-$n_R$ demap on the basis of mapping information reported in advance from the transmitting device a1, and separate the data from the pilot symbols. The separated first pilot symbols are output to the path extractors b105-$n_R$, the second pilot symbol are output to the channel estimators b106-$n_R$, and the data is output to the MIMO demultiplexer b107.

The path extractors b105-$n_R$ compute path information by using the first pilot symbols input from the demapping units b104-$n_R$, and output to the channel estimators b106-$n_R$. A specific process will be discussed later using FIG. 8.

The channel estimators b106-$n_R$ compute second CFR estimation values by using the second pilot symbols input from the demapping units b104-$n_R$ and the path information input from the path extractors b105-$n_R$, and output to the MIMO demultiplexer b107. A specific process will be discussed later using FIG. 9.

The MIMO demultiplexer b107 uses the U second CFR estimation values input from the channel estimators b106-$n_R$, or in other words UN$_R$ second CFR estimation values, to compute filter coefficients on a zero-forcing (ZF) basis, minimum mean square error (MMSE) basis, or the like, and conduct MIMO demultiplexing. Alternatively, the MIMO demultiplexer b107 may use the UN$_R$ second CFR estimation values to conduct demultiplexing by using a non-linear process such as maximum likelihood detection (MLD).

These established technologies are used to compute a bit log likelihood ratio (LLR), which is output to the decoder b108.

The decoder b108 uses the bit LLR input from the MIMO demultiplexer b107 to conduct a decoding process using, for example, maximum likelihood decoding, maximum a posteriori probability (MAP), log-MAP, Max-log-MAP, the soft output Viterbi algorithm (SOVA), or the like.

Figure 8:
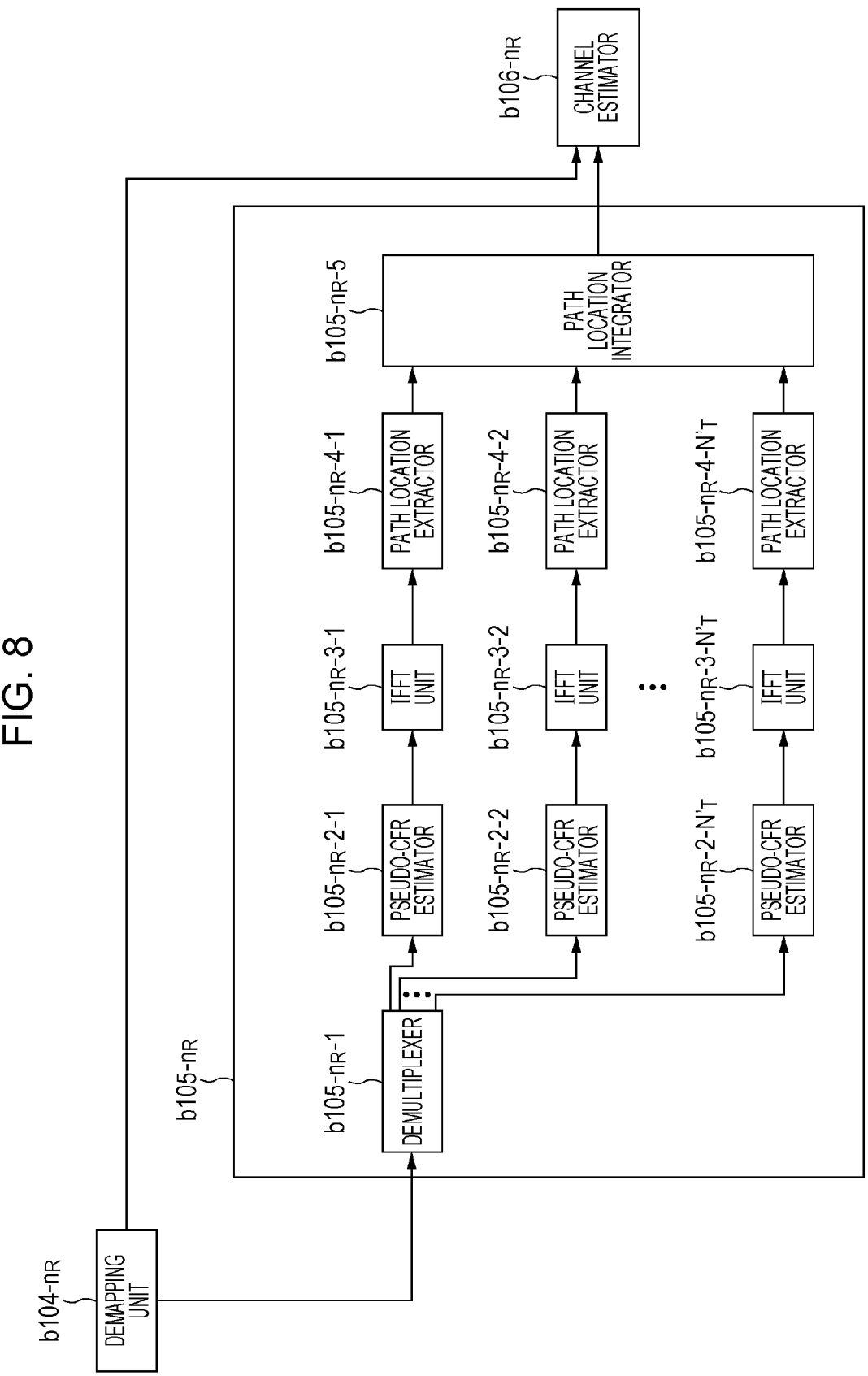
FIG. 8 is a schematic block diagram illustrating a configuration of a path extractor b105-nR.

FIG. 8 is a schematic block diagram illustrating a configuration of a path extractor b105-$n_R$.

In this diagram, the path extractor b105-$n_R$ is configured to include a demultiplexer b105-$n_R$-1, pseudo channel frequency response (CFR) estimators b105-$n_R$-2-n'$_T$, IFFT units b105-$n_R$-3-n'T, path location extractors b105-$n_R$-4-n'T, and a path location integrator b105-$n_R$-5. Herein, n'$_T$=1, 2, ..., N'$_T$.

The demultiplexer b105-$n_R$-1 demultiplexes into individual streams a received signal of resource elements with inserted first pilot symbols that is input from a demapping unit b104-$n_R$, and outputs the n'$_T$-th stream to the pseudo-CFR estimators b105-$n_R$-2-n'$_T$.

The pseudo-CFR estimators b105-$n_R$-2-n'$_T$ estimate the CFR (called the pseudo-CFR estimation value) of subcarriers into which a first pilot symbol has been inserted, and output the pseudo-CFR estimation values to the IFFT units b105-$n_R$-3-n'$_T$.

The IFFT units b105-$n_R$-3-n'$_T$ apply a frequency-to-time transform to the pseudo-CFR estimation values input from the pseudo-CFR estimators b105-$n_R$-2-n'$_T$, thereby converting the pseudo-CFR estimation values into pseudo channel impulse response (CIR) estimation values. The pseudo-CIR estimation values are output to the path location extractors b105-$n_R$-4-n'$_T$.

The path location extractors b105-$n_R$-4-n'$_T$ extract $N_s$ paths in order of highest power from among the pseudo-CIR estimation values input from the IFFT units b105-$n_R$-3-n'$_T$. The extracted path information is output to the path location integrator b105-$n_R$-5. Note that the value of $N_s$ may be decided during the design stage of the receiving device b1, and be a value such as 50, 60, or 70, or may be made variable during the design stage and updated when updating the firmware or software of the receiving device b1, for example.

The path location integrator b105-$n_R$-5 integrates the N'$_T$ varieties of path information input from the path location extractors b105-$n_R$-4-n'$_T$, and outputs to a channel estimator b106-$n_R$. This operation will be discussed later in conjunction with the operating principles.

Figure 9:
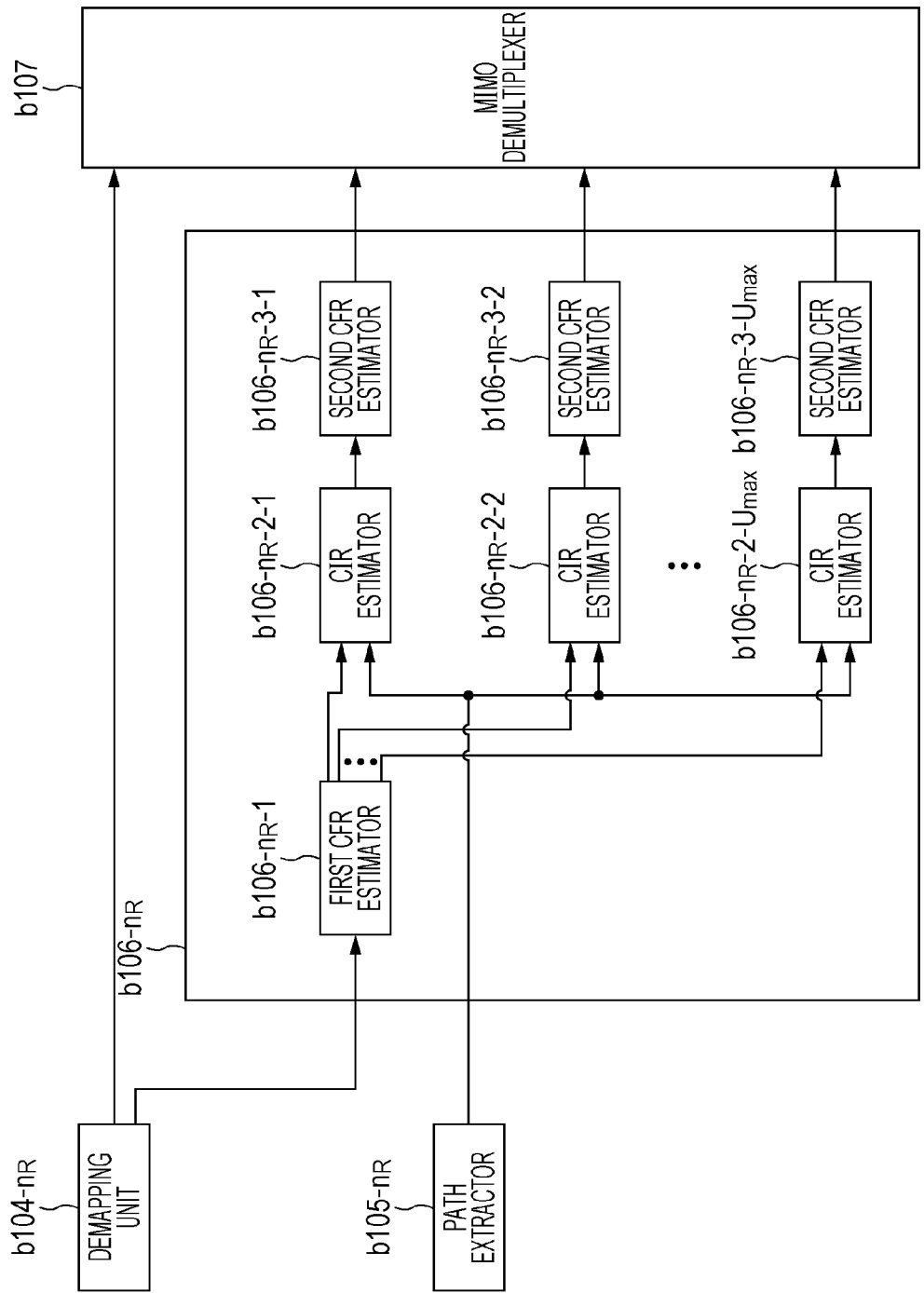
FIG. 9 is a schematic block diagram illustrating a configuration of a channel estimator b106-nR.

FIG. 9 is a schematic block diagram illustrating a configuration of a channel estimator b106-$n_R$.

In this diagram, the channel estimator b106-$n_R$ is configured to include a first CFR estimator b106-$n_R$-1, CIR estimators b106-$n_R$-2-u, and second CFR estimators b106-$n_R$-3-u. Herein, u=1, 2, ..., U$_{max}$. Note that U$_{max}$ is the maximum number of streams that the receiving device b1 is able to receive. In the case in which the number of transmitted streams is U, then from among u=1, 2, ..., U$_{max}$, only U are used. This applies similar hereinafter.

The first CFR estimator b106-$n_R$-1 uses a second pilot symbol input from a demapping unit b104-$n_R$ to estimate, for U multiplexed streams, a first CFR of the subcarrier into which a second pilot symbol is inserted. In the case in which the second pilot symbol is the DMRS, it is sufficient to decode the DMRS that is code-multiplexed into the target subcarrier. The first CFR estimation value of the estimated uth stream is output to the CIR estimators b106-$n_R$-2-u.

The CIR estimators b106-$n_R$-2-u compute CIR estimation values by using the first CFR estimation value of the uth stream input from the first CFR estimator b106-$n_R$-1, and the path information input from a path extractor b105-$n_R$. The computed CIR estimation values are output to the second CFR estimators b106-$n_R$-3-u.

The second CFR estimators b106-$n_R$-3-u apply a time-to-frequency transform to the CIR estimation values input from the CIR estimators b106-$n_R$-2-u, thereby converting the CIR estimation values to CFR (called the second CFR). The second CFR estimators b106-$n_R$-3-u output the computed second CFR estimation values to the MIMO demultiplexer b107.

<Operating Principles>

Hereinafter, the operating principles of the receiving device b1 will be described with reference to FIG. 7.

A received signal $r_{n_R}(t)$ at time t received by a receiver $b101\text{-}n_R$ is expressed by the following formulas (1) to (3).

[Math. 1]

$$r_{n_R}(t) = \sum_{n_T=1}^{N_T} \int_0^{T_D} h_{n_R,n_T}(\tau) s_{n_T}(t-\tau) d\tau + z_{n_R}(t) \quad (1)$$

$$s_{n_T}(t) = \sum_{i=0}^{\infty} s_{n_T,i}(t) \quad (2)$$

$$s_{n_T,i}(t) = \quad (3)$$

$$\frac{1}{\sqrt{N}} \sum_{n=0}^{N-1} s_{n_T,i,n} \exp[j2\pi n \Delta_f (t - iT_s - T_G)] \text{ for } iT_s \leq t < (i+1)T_s$$

Herein, $T_D$ is the maximum delay time, $h_{n_R,n_T}(\tau)$ is the complex amplitude at a delay time $\tau$ from a transmitting antenna $a1\text{-}n_T$ to a receiving antenna $b1\text{-}n_R$, $s_{n_T}(t)$ is the transmitted signal from the transmitting antenna $a1\text{-}n_T$, $z_{n_R}(t)$ is the noise at the receiving antenna $b1\text{-}n_R$, $s_{n_T,i}(t)$ is the transmitted signal from the transmitting antenna $a1\text{-}n_T$ for only the ith symbol, N is the number of FFT points, $s_{n_T,i,n}$ is the modulated signal from the transmitting antenna $a1\text{-}n_T$ of the nth subcarrier for the ith symbol, $T_G$ is the guard interval length, $T_s$ is the length of the OFDM symbol interval, and $\Delta f$ is the frequency spacing between subcarriers. Note that the complex amplitude $h_{n_R,n_T}(\tau)$ over $\tau=0$ to $\tau=T_D$ is collectively designated the channel impulse response. However, the transmitted signal and the received signal are modelled so that the leading waves are synchronized, and there is assumed to be no channel variation within a subframe.

Figure 10:
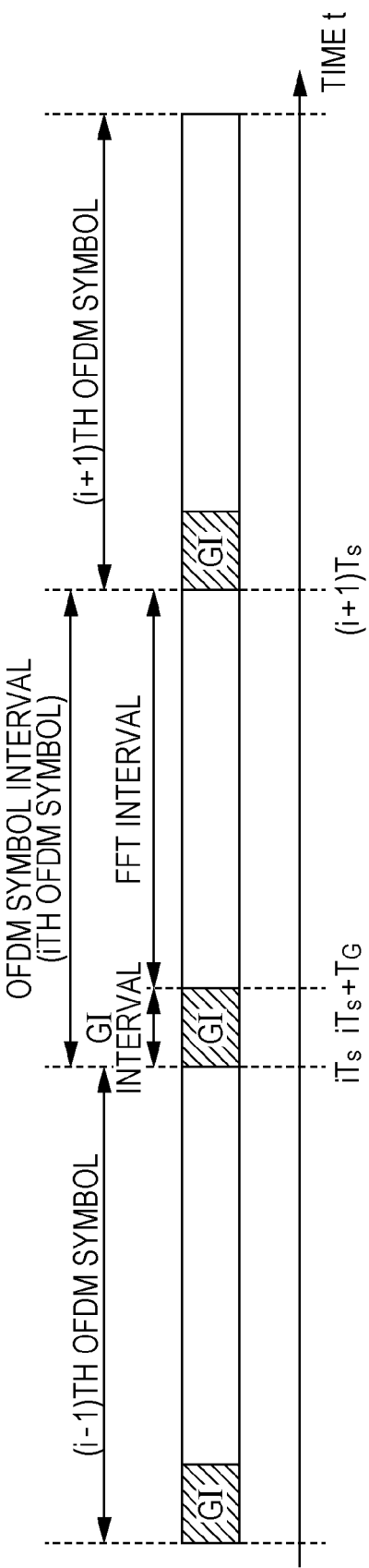
FIG. 10 is a diagram illustrating a layout of a transmitted signal snT,i(t) from a transmitting antenna a1-nT for the ith symbol.

FIG. 10 illustrates a layout of a transmitted signal $s_{n_T,i}(t)$ from the transmitting antenna $a1\text{-}n_T$ for the ith symbol. The transmitted signal $s_{n_T}(t)$ is made up of these individual OFDM symbols arranged sequentially in time.

Figures 11, 12:
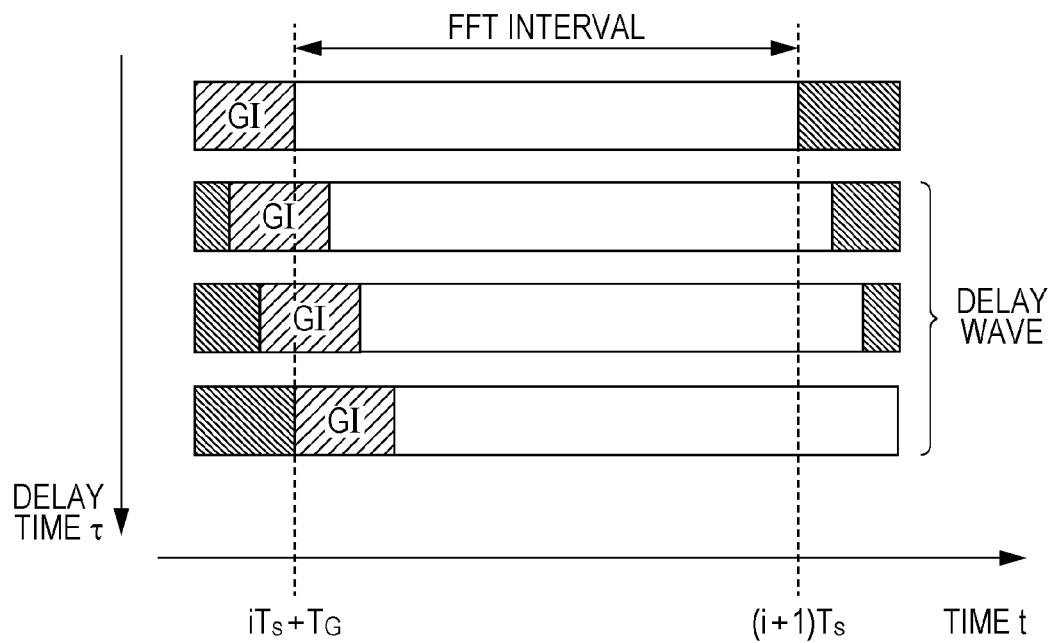
FIG. 11 is a diagram illustrating a layout near the ith symbol of a received signal received by a receiver b101-nR.
FIG. 12 is a diagram illustrating sign vectors du.

FIG. 11 illustrates a layout near the ith symbol of a received signal received by a receiver $b101\text{-}n_R$. For the sake of simplicity, FIG. 11 illustrates a case in which a leading wave and three delay paths arrive for $n_T=1$, but in actual practice, delayed paths arrive continuously as modelled by the formula (1).

Hereinafter, the demodulation and decoding of the ith symbol will be considered. A received signal in the digital domain is received by a receiver $b101\text{-}n_R$, the GI is removed by a GI remover $b102\text{-}n_R$, and a time-to-frequency transform is applied by an FFT unit $b103\text{-}n_R$. The received signal $R_{n_R,i,n}$ of the nth subcarrier for the ith symbol obtained as a result is expressed by the following formulas (4) and (5).

[Math. 2]

$$R_{n_R,i,n} = \frac{1}{\sqrt{N}} \sum_{k=N_g}^{N_g+N-1} r_{n_R}(iT_s + k\Delta_t) \exp\left[-j\frac{2\pi n}{N}(k-N_g)\right] = \quad (4)$$

$$\sum_{n_T=1}^{N_T} H_{n_R,n_T,n} s_{n_T,i,n} + Z_{n_R,i,n}$$

$$H_{n_R,n_T,n} = \int_0^{T_D} h_{n_R,n_T}(\tau) \exp(-j2\pi n \Delta_f \tau) \quad (5)$$

Herein, $H_{n_R,n_T,n}$ is the CFR from the transmitting antenna $a1\text{-}n_T$ to the receiving antenna $b1\text{-}n_R$ on the subcarrier n, $Z_{n_R,i,n}$ is the noise at the receiving antenna $b1\text{-}n_R$ in the nth subcarrier for the ith symbol, and $\Delta t$ is the sampling frequency of the digital signal, for which the relationship $\Delta_f=1/N\Delta_t$ holds. Note that $T_D$ has been modelled so as to not exceed $T_G$. Also, $T_G=N_g\Delta t$. Note that $S_{n_T,i,n}$ is the signal output by the precoding unit $a105$ of the transmitting device $a1$ in FIG. 3.

Provided that $R_{i,n}$ is a vector representation of the received signals at the receiving antennas $b1\text{-}1$ to $b1\text{-}N_R$, $R_{i,n}$ is expressed by the following formulas (6) to (8).

[Math. 3]

$$R_{i,n} = (R_{1,i,n} \cdots R_{N_R,i,n})^T \quad (6)$$

$$= H_n S_{i,n} + Z_{i,n}$$

$$H_n = \begin{pmatrix} H_{1,1,n} & \cdots & H_{1,N_T,n} \\ \vdots & \ddots & \vdots \\ H_{N_R,1,n} & \cdots & H_{N_R,N_T,n} \end{pmatrix} \quad (7)$$

$$Z_{i,n} = (Z_{1,i,n} \cdots Z_{N_R,i,n})^T \quad (8)$$

Herein, $H_n$ is an $N_R \times N_T$ CFR matrix, $S_{i,n}$ is an $N_T \times 1$ transmitted signal vector, $Z_{i,n}$ is an $N_R \times 1$ noise vector, and $X^T$ represents the transpose of X. Also, an $N_T \times U$ precoding matrix V is expressed by the following formula (9). Note that although precoding is preferable from the standpoint of improved transmission performance, the case of not conducting precoding is also included in the present invention.

[Math. 4]

$$V = \begin{pmatrix} v_{1,1} & \cdots & v_{1,U} \\ \vdots & \ddots & \vdots \\ v_{N_R,1} & \cdots & v_{N_R,U} \end{pmatrix} \quad (9)$$

Provided that $c_{u,i,n}$ is the transmitted signal before precoding in the uth stream of the nth subcarrier for the ith symbol, the received signal vector $R_{i,n}$ may be rewritten as in the following formulas (10) to (13).

[Math. 5]

$$R_{i,n} = H_{v,n} c_{i,n} + Z_{i,n} \quad (10)$$

$$H_{v,n} = H_n V = \begin{pmatrix} H_{v,1,1,n} & \cdots & H_{v,1,U,n} \\ \vdots & \ddots & \vdots \\ H_{v,N_R,1,n} & \cdots & H_{v,N_R,U,n} \end{pmatrix} \quad (11)$$

$$H_{v,n_R,u,n} = \sum_{n_T=1}^{N_T} H_{n_R,n_T,n} v_{n_T,u} \quad (12)$$

$$c_{i,n} = (c_{1,i,n} \cdots c_{U,i,n})^T \quad (13)$$

Consequently, in order to estimate a transmitted modulation symbol $c_{u,i,n}$, it is sufficient to estimate and use $H_{v,n_R,n_T,n}$, that is, the CFR after being affected by precoding.

At this point, the remaining function of the receiving device b1 will be described as that which obtains the second CFR estimation value $H''_{v,n_R,n_T,n}$, that is, an estimated value of $H_{v,n_R,n_T,n}$ used for demodulation. The operating principles of the path extractors $b105\text{-}n_R$ and the channel estimators $b106\text{-}n_R$ that estimate $H''_{v,n_R,n_T,n}$ will be discussed later.

In the case of using MMSE-based MIMO demultiplexing, for example, the MIMO demultiplexer b107 computes a demultiplexed symbol $c'_{u,i,n}$ in the uth stream of the nth subcarrier for the ith symbol by using the following formulas (14) and (15).

[Math. 6]

$$c'_{u,i,n} = e_u^T (H''^H_{v,n} H''_{v,n} + \sigma^2 I_U)^{-1} H''^H_{v,n} R_{i,n} \quad (14)$$

$$H''_{v,n} = \begin{pmatrix} H''_{v,1,1,n} & \cdots & H''_{v,1,U,n} \\ \vdots & \ddots & \vdots \\ H''_{v,N_R,1,n} & \cdots & H''_{v,N_R,U,n} \end{pmatrix} \quad (15)$$

Herein, $X^H$ represents the complex conjugate transpose of X, and $e_u$ is a vector of size of U×1 in which only the uth element is 1, while all other elements are 0. Consequently, when U=4, for example, $e_2 = (0\ 1\ 0\ 0)^T$. Also, $\sigma^2$ is the power of and may be estimated as in the following formula (16) by using a replica $c''_{u,i,n}$ of $c_{u,i,n}$ obtained using a decoding result.

[Math. 7]

$$\sigma^2 = \frac{1}{NN_R} \sum_{n=0}^{N-1} (R_{i,n} - H''_{i,n} c''_{i,n})^H (R_{i,n} - H''_{i,n} c''_{i,n}) \quad (16)$$

However, in the case of not using all N subcarriers, the number of subcarriers to average is adjusted as appropriate. This process may be conducted with already-decoded symbols. Note that rather than just averaging the subcarrier directions as in formula (16), an average related to a symbol (an average related to i) may be used, or a weighted average may be conducted in which older results are progressively forgotten. Also, for $c''_{u,i,n}$ a soft replica created using an output result from the decoder b108 may be used, or a hard replica created by hard decision of a demodulation result may be used. Also, rather than a decoding result, the demodulation result $c''_{u,i,n}$ may be used directly, or a hard replica created by hard decision thereof may be used. Also, in the case in which the symbol corresponds to a pilot symbol, the pilot symbol may be used directly.

The MIMO demultiplexer b107 computes a bit log likelihood ratio from the MIMO-demultiplexed symbol of formula (14). An equivalent amplitude gain is used for this computational process. Specifically, in the case of QPSK, for an equivalent amplitude gain $\mu_{u,i,n}$ in the uth stream of the nth subcarrier for the ith symbol expressed by the following formula (17), the bit log likelihood ratio is expressed by the following formulas (18) and (19). Herein, the formulas (18) and (19) are the bit log likelihood ratios $\lambda(b_{u,i,n,0})$ and $\lambda(b_{u,i,n,1})$ of the first bit and the second bit $b_{u,i,n,1}$, respectively.

[Math. 8]

$$\mu_{u,i,n} = e_u^T (H''^H_{v,n} H''_{y,n} + \sigma^2 I_U)^{-1} H''^H_{v,n} e_u \quad (17)$$

$$\lambda(b_{u,i,n,0}) = \frac{4\ Re\lfloor c'_{u,i,n} \rfloor}{\sqrt{2}\ (1 - \mu_{u,i,n})} \quad (18)$$

$$\lambda(b_{u,i,n,1}) = \frac{4\ Im\lfloor S'_{u,i,n} \rfloor}{\sqrt{2}\ (1 - \mu_{u,i,n})} \quad (19)$$

Next, channel estimation will be described. First, a method of computing the second CFR estimation value will be described with reference to FIG. 9, and after that, path extraction will be described with reference to FIG. 8.

In the first CFR estimator b106-$n_R$-1, a first CFR estimation value is computed by using the DMRS inserted as in FIG. 5. In LTE-A, the DMRS of the 1st, 2nd, 5th, and 7th streams is inserted into the pattern of 501 in FIG. 5, while the DMRS of the 3rd, 4th, 6th, and 8th streams is inserted into the pattern of 502. For the sake of explanation, 501 of FIG. 5 will be used to describe the case of inserting the DMRS of the 1st, 2nd, 5th, and 7th streams.

With the DMRS, code multiplexing is conducted using four resource elements in the same subcarrier. Provided that $d_u$ is the code vector of the uth stream with a size of 4×1, the signal of each resource element of the subcarrier into which is inserted the DMRS of 501 in FIG. 5 becomes like the following formula (20).

[Math. 9]

$$(c_{u,5,n} c_{u,6,n} c_{u,12,n} c_{u,13,n})^T = d_u c_{p,u,n} \quad (20)$$

Herein, $c_{p,u,n}$ is the pilot symbol in the nth subcarrier of the uth stream. With reference to 501 of FIG. 5, n is restricted to 1, 5, and 11. In the corresponding resource elements, a signal is not transmitted from the 1st, 2nd, 5th, and 7th streams. Also, $d_u$ is expressed in FIG. 12. Consequently, the received signal that is received by a receiving antenna b1-$n_R$ at the resource element expressed by the formula (20) becomes like the following formula (21), with reference to the formula (10).

[Math. 10]

$$(R_{n_R,5,n}\ R_{n_K,6,n}\ R_{n_R,12,n}\ R_{n_R,13,n})^T = \quad (21)$$
$$\sum_{u \in (1,2,5,7)} H_{v,n_R,u,n} d_u c_{p,u,n} + (Z_{n_R,5,n}\ Z_{n_R,6,n}\ Z_{n_R,12,n}\ Z_{n_R,13,n})^T$$

At this point, first CFR estimation values $H'_{v,nR,u,n}$ may be obtained by multiplying the code vectors $d_u$ by the received signal vector of the formula (21), and are expressed like in the following formulas (22) and (23).

[Math. 11]

$$H'_{v,n_R,u,n} = \quad (22)$$
$$\frac{1}{4c_{p,u,n}} d_u^T (R_{n_R,5,n}\ R_{n_R,6,n}\ R_{n_R,12,n}\ R_{n_R,13,n})^T = H_{v,n_R,u,n} + Z'_{v,n_R,u,n}$$

$$Z'_{v,n_R,u,n} = \frac{1}{4c_{p,u,n}} d_u^T (Z_{n_R,5,n}\ Z_{n_R,6,n}\ Z_{n_R,12,n}\ Z_{n_R,13,n})^T \quad (23)$$

This utilizes the fact that the $d_u$ vectors (where u=1, 2, 5, 7) are respectively orthogonal, as indicated in FIG. 12. Likewise, the first CFR estimation values for u=3, 4, 6, 8 may be obtained by using the formula (22) and conducting a similar operation on each of the relevant subcarriers in 502 of FIG. 5 (0, 4, and 10 in the drawing).

Next, the CIR estimators b106-$n_R$-2-u will be described. In the first embodiment, suppose that the channel impulse response h(τ) may sampled at τ=0, Δt, ... , DΔ$_t$. Herein, DΔ$_t$=T$_d$. This corresponds to assuming that the channel is a finite impulse response (FIR) filter, and estimating the CIR by estimating the coefficients of that filter. At this point, a vector $H'_{v,nR,u}$ whose elements are the first CFR estimation values $H'_{v,nR,u,n}$ becomes like the following formulas (24) to (28).

[Math. 12]

$$H'_{v,n_R,u} = \\ (H'_{v,n_R,u,n_1}\ H'_{v,n_R,u,n_2}\ \cdots\ H'_{v,n_R,u,n_P})^T = Fh_{v,n_R,u} + Z'_{v,n_R,u} \quad (24)$$

$$F = \begin{bmatrix} 1 & \exp\left(-j\frac{2\pi n_1}{N}\right) & \cdots & \exp\left(-j\frac{2\pi n_1}{N}(L-1)\right) \\ 1 & \exp\left(-j\frac{2\pi n_2}{N}\right) & \cdots & \exp\left(-j\frac{2\pi n_2}{N}(L-1)\right) \\ \vdots & \vdots & \ddots & \vdots \\ 1 & \exp\left(-j\frac{2\pi n_P}{N}\right) & \cdots & \exp\left(-j\frac{2\pi n_P}{N}(L-1)\right) \end{bmatrix} \quad (25)$$

$$h_{v,n_R,u} = (h_{v,n_R,u,0}\ \cdots\ h_{v,n_R,u,L-1})^T \quad (26)$$

$$h_{v,n_R,u,d} = \sum_{n_T=1}^{N_T} h_{n_R,n_T}(d\Delta_t)v_{n_T,u} \quad (27)$$

$$Z'_{v,n_R,u} = (Z'_{v,n_R,u,n_1}\ \cdots\ Z'_{v,n_R,u,n_P})^T \quad (28)$$

Herein, $n_1, \ldots, n_P$ are the pilot subcarriers, where P is the number of pilot subcarriers. Referring to 501 of FIG. 5, $n_1=1$, $n_2=5$, and $n_3=11$, and if additionally allocated frequencies continue, $n_4=13$, $n_5=17$, and $n_6=23$. Also, F is the P×L discrete Fourier transform matrix, where L is an anticipated maximum discrete delay time. It is sufficient to set L to a large value, so that L>D. For example, L may be set to the number $N_g$ of GI points, or to a value exceeding $N_g$.

At this point, a CIR estimation vector $h_{v,n_R,u}$ is expressed using MMSE like in the following formulas (29) and (30).

[Math. 13]

$$h'_{v,n_R,u} = C_{v,h}F^H(FC_{v,h}F^H + \sigma'^2 I_P)^{-1} H'_{v,n_R,u} \quad (29)$$

$$C_{v,h} = E[h_{v,n_R,u}h_{v,n_R,u}^H] \quad (30)$$

Herein, E[X] represents the ensemble average of X, and the diagonal elements of $C_{v,h}$ express the PDP. $C_{v,h}$ is computed by the path extractors b105-$n_R$ discussed later.

Next, the second CFR estimators b106-$n_R$-3-u will be described. The second CFR estimators b106-$n_R$-3-u apply a time-to-frequency transform to the CIR estimation values input from the CIR estimators b106-$n_R$-2-u, and estimate second CFR estimation values $H'_{v,nR,u,n}$. This may be obtained like in the following formulas (31) and (32).

[Math. 14]

$$H'_{v,n_R,u} = (H''_{v,n_R,u,0}\ \cdots\ H''_{v,n_R,u,N-1})^T = F_A h'_{v,n_R,H} \quad (31)$$

$$F_A = \begin{bmatrix} 1 & 1 & \cdots & 1 \\ 1 & \exp\left(-j\frac{2\pi}{N}\right) & \cdots & \exp\left(-j\frac{2\pi}{N}(L-1)\right) \\ \vdots & \vdots & \ddots & \vdots \\ 1 & \exp\left(-j\frac{2\pi(N-1)}{N}\right) & \cdots & \exp\left(-j\frac{2\pi(N-1)}{N}(L-1)\right) \end{bmatrix} \quad (32)$$

Herein, FA is an N×L discrete Fourier transform matrix that covers the entire bandwidth from n=0 to n=N−1. The second CFR estimation values $H''_{v,nR,u,n}$ in the user-allocated bandwidth are output to the MIMO demultiplexer b107.

Next, operations of the path extractors b105-$n_R$ will be described with reference to FIG. 8. The demultiplexer b105-$n_R$-1 demultiplexes a received signal into resource elements into which the first pilot symbol is placed for every $n'_t$-th stream. Returning to FIG. 4, the CRS of the 1st stream are the gray resource elements in 401. In the case of the second stream, the received signal of the gray resource elements in 402 are retrieved and output to the pseudo-CFR estimators b105-$n_R$-2-$n'_t$.

As indicated by FIG. 4, with the CRS, a pilot symbol is transmitted without performing precoding, and a signal from another antenna is not transmitted in the same resource element. Consequently, pseudo-CFR estimation values $H'_{nR,n'T,n}$ may be calculated like in the following formula (33).

[Math. 15]

$$H'_{n_R,n'_T,n} = \frac{R_{n_R,i,n}}{c_{n'_T,i,n}} \quad (33)$$

Herein, $c_{n'T,i,n}$ is the CRS, and is realized only in the case in which the symbol number i and the subcarrier number indicate a gray location in FIG. 4. Note that in 401 and 402 of FIG. 4, since two pilot symbols are placed in the same subcarrier, the formula (33) is used to compute a pseudo-CFR estimation value at each position, and the average of these two values is used thereafter.

Figure 13:
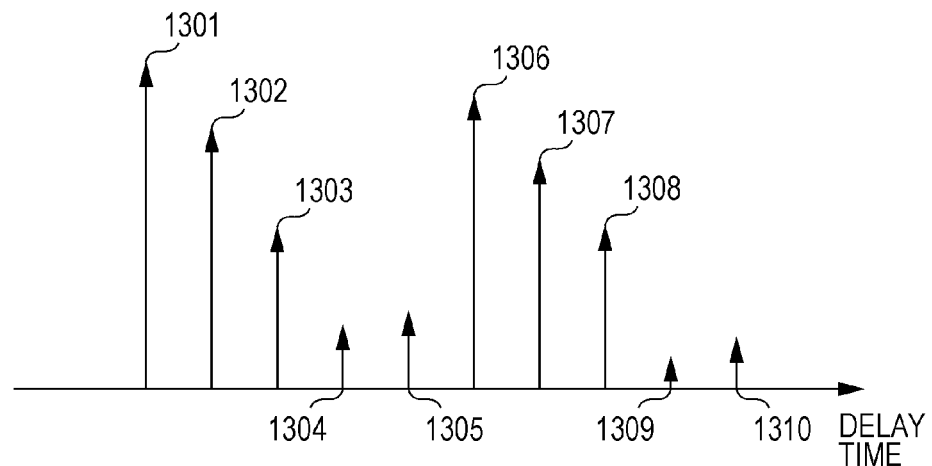
FIG. 13 is a diagram illustrating a first example of a waveform obtained by performing a frequency-to-time transform such as the IFFT on pseudo-CFR estimation values, and extracting only the paths for discrete delay times from 0 to L−1.

In the IFFT units b105-$n_R$-3-$n'_T$, a frequency-to-time transform such as the IFFT is applied to the pseudo-CFR estimation values obtained with the formula (33). Furthermore, only the paths with a discrete delay time from 0 to L−1 are extracted. FIG. 13 is one example of a waveform obtained as a result, where L=10. In the case of extracting six paths in order of highest level from among the paths 1301 to 1310, only the paths 1301 to 1303 and 1306 to 1308 remain. Path information extracted in this way is output to the path location integrator b105-$n_R$-5.

Figure 14:
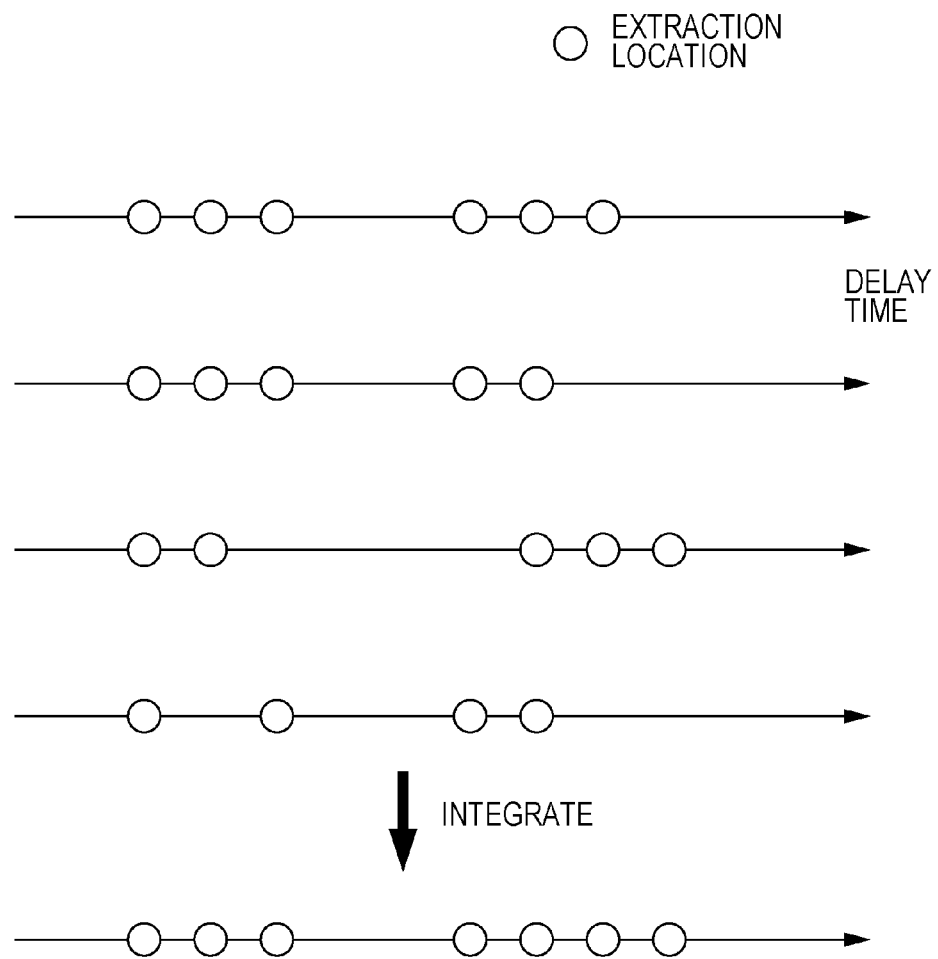
FIG. 14 is a diagram illustrating a first example of integrating input location information.

The path location integrator b105-$n_R$-5 integrates the input $N'_T$ varieties of path location information. Specifically, if the discrete delay time d is extracted on one of the streams from 1 to $N'_T$, that position d is treated as extracted, even if not extracted on another stream. For example, the path location information is integrated as in FIG. 14.

Note that, as indicated in FIG. 4, in the case of the CRS, there are many pilot symbols inserted into the first and second antennas, and thus path extraction may also be conducted on only the first and second antennas. In other words, it may be configured so that the configuration in FIG. 8 from the pseudo-CFR estimators b105-$n_R$-2-$n'_T$ to the path location extractors b105-$n_R$-4-$n'_T$ are made to operate only for $n'_T=1$ and 2. Also, path extraction may also be conducted only for one of either the first or the second antenna.

Provided that q is a path location information vector of size L×1 in which an extracted position is treated as 1 and other positions as 0, $C_{v,h}$ used in the calculation of the formula (29) is computed like in the following formula (34).

[Math. 16]

$$C_{v,h} = \alpha\,\mathrm{diag}(q) \quad (34)$$

Herein, diag(q) is an L×L matrix having the respective elements of q as the main diagonal elements. For example, when $q=(1\ 1\ 0\ 1)^T$, diag(q) becomes like the following formula (35).

[Math. 17]
$$diag(q) = \begin{pmatrix} 1 & 0 & 0 & 0 \\ 0 & 1 & 0 & 0 \\ 0 & 0 & 0 & 0 \\ 0 & 0 & 0 & 1 \end{pmatrix} \quad (35)$$

Also, α is a hyper parameter, to which a fixed value such as 0.5 or 0.25 may be assigned, and is optimized every time the formula (29) is calculated by using established technology such as an expectation maximization (EM) algorithm.

<Operations of Receiving Device b1>

Figure 15:
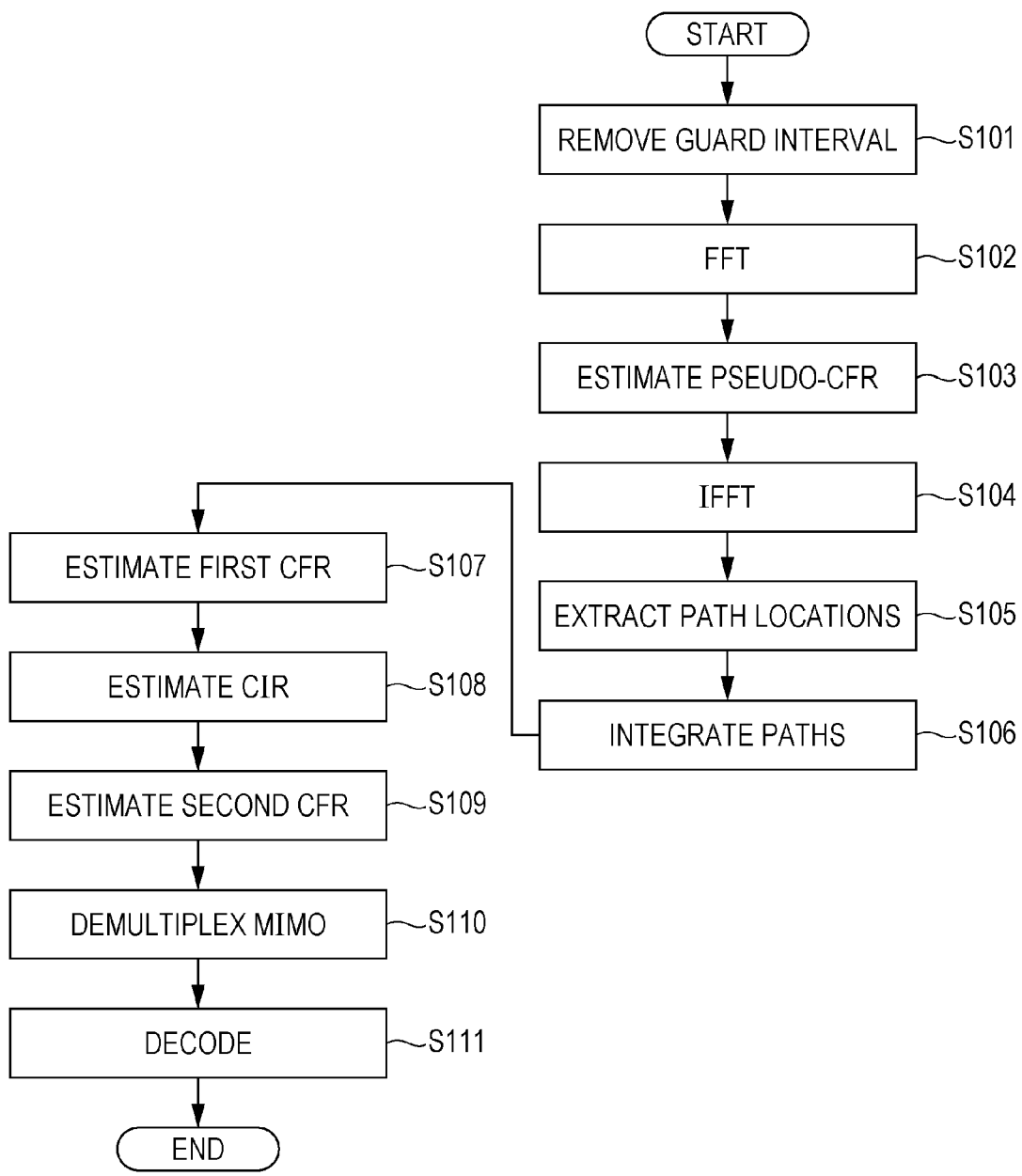
FIG. 15 is a flowchart illustrating operations of a receiving device according to the first embodiment.

FIG. 15 is a flowchart illustrating operations of a receiving device according to the present embodiment. Note that the operations illustrated in this diagram are a process after the receivers $b101\text{-}n_R$ in FIG. 7 output received signals to the GI removers $b102\text{-}n_R$.

(Step S101) The GI removers $b102\text{-}n_R$ remove the GI from the received signals. After that, the process proceeds to step S102.

(Step S102) The FFT units $b103\text{-}n_R$ apply a time-to-frequency transform to the signals obtained in step S101. The demapping units $b104\text{-}n_R$ separate from the obtained frequency-domain signals the received signals of resource elements in which data, the first pilot symbol, and the second pilot symbol were respectively transmitted. The received signals of resource elements in which data was transmitted are output to the MIMO demultiplexer b107, the received signals of resource elements in which the first pilot symbol was transmitted are output to the path extractors $b105\text{-}n_R$, and the received signals of resource elements in which the second pilot symbol was transmitted are output to the channel estimators $b106\text{-}n_R$. Additionally, the demultiplexer $b105\text{-}n_R\text{-}1$ of the path extractors $b105\text{-}n_R$ demultiplexes into each transmitting antenna the received signals of the resource elements in which the first pilot symbol was transmitted. After that, the process proceeds to step S103.

(Step S103) The pseudo-CFR estimators $b105\text{-}n_R\text{-}2\text{-}n'_T$ compute for each transmitting antenna pseudo-CFR estimation values in the resource elements in which the first pilot symbol was transmitted. After that, the process proceeds to step S104.

(Step S104) The IFFT units $b105\text{-}n_R\text{-}3\text{-}n'_T$ apply a frequency-to-time transform to the pseudo-CFR estimation values obtained in step S103, thereby converting the pseudo-CFR estimation values into pseudo-CIR estimation values. After that, the process proceeds to step S105.

(Step S105) The path location extractors $b105\text{-}n_R\text{-}4\text{-}n'_T$ extract a designated number of paths in order of highest power from among the pseudo-CIR estimation values obtained in step S104. After that, the process proceeds to step S106.

(Step S106) The path location integrator $b105\text{-}n_R\text{-}5$ integrates the path location of each transmitting antenna obtained in step S105. After that, the process proceeds to step S107.

(Step S107) The first CFR estimator $b106\text{-}n_R\text{-}1$ of the channel estimators $b106\text{-}n_R$ (FIG. 9) computes first CFR estimation values by using the received signals of resource elements in which the second pilot symbol was transmitted that were obtained in step S102. After that, the process proceeds to step S108.

(Step S108) The CIR estimators $b106\text{-}n_R\text{-}2\text{-}u$ compute CIR estimation values by using the path location information obtained in step S106 and the first CFR estimation values obtained in step S107. After that, the process proceeds to step S109.

(Step S109) The second CFR estimators $b106\text{-}n_R\text{-}3\text{-}u$ apply a time-to-frequency transform to the CIR estimation values obtained in step S108, thereby converting the CIR estimation values into second CFR estimation values. After that, the process proceeds to step S110.

(Step S110) The MIMO demultiplexer b107 conducts MIMO demultiplexing by using the received signals of resource elements in which the data was transmitted that were obtained in step S102 and the second CFR estimation values obtained in step S109, and computes the LLR of the encoded bits. After that, the process proceeds to step S111.

(Step S111) The decoder b108 conducts decoding by using the LLR of the encoded bits obtained in step S110. After that, the receiving device b1 ends the operations.

In this way, according to the present embodiment, a PDP configuration unit operates as a path extractor, and a first pilot symbol is used to extract effective paths for estimation. After that, a channel estimator computes first CFR estimation values using a second pilot symbol, computes CIR estimation values by using path location information extracted by the path extractor and the first CFR estimation values, and then converts the CIR estimation values into second CFR estimation values. By using this technology in cases such as when the bandwidth into which is inserted the first pilot symbol is wider than the bandwidth into which is inserted the second pilot symbol, the path extraction accuracy improves, and by computing second CFR estimation values using more accurate path information, the channel estimation accuracy improves. By using more accurate channel estimation values, the accuracy of MIMO demultiplexing may be improved.

Note that although the foregoing first embodiment describes a case in which the receiving device b1 is equipped with $N_R$ path extractors $b105\text{-}n_R$ as in FIG. 7, there may also be one path extractor. In this case, the path information extracted by the one path extractor may be shared among all channel estimators $b106\text{-}n_R$.

Note that although the foregoing first embodiment describes a case of using second CFR estimation values as channel estimation values for demodulation, the channel estimation technology of the present embodiment may also be applied to devices such as a receiving device that conducts an interference cancellation process by using CIR estimation values.

(Second Embodiment)

Hereinafter, a second embodiment of the present invention will be described in detail and with reference to the drawings. In the first embodiment, a transmitting device a1 transmits a signal by mapping a first pilot symbol and a second pilot symbol in the frequency domain, while a receiving device b1 uses the first pilot symbol to extract a designated number of paths in order of highest power from among obtained pseudo-CIR estimation values. In addition, the second pilot symbol and the obtained path information is used to compute second CFR estimation values. The present embodiment describes a case of computing a channel match for each path, and extracting paths in order of greatest channel match.

Since the configuration of a transmitting device a2 according to the present embodiment is the same as the transmitting device a1 according to the first embodiment, the description will be reduced or omitted.

Figure 16:
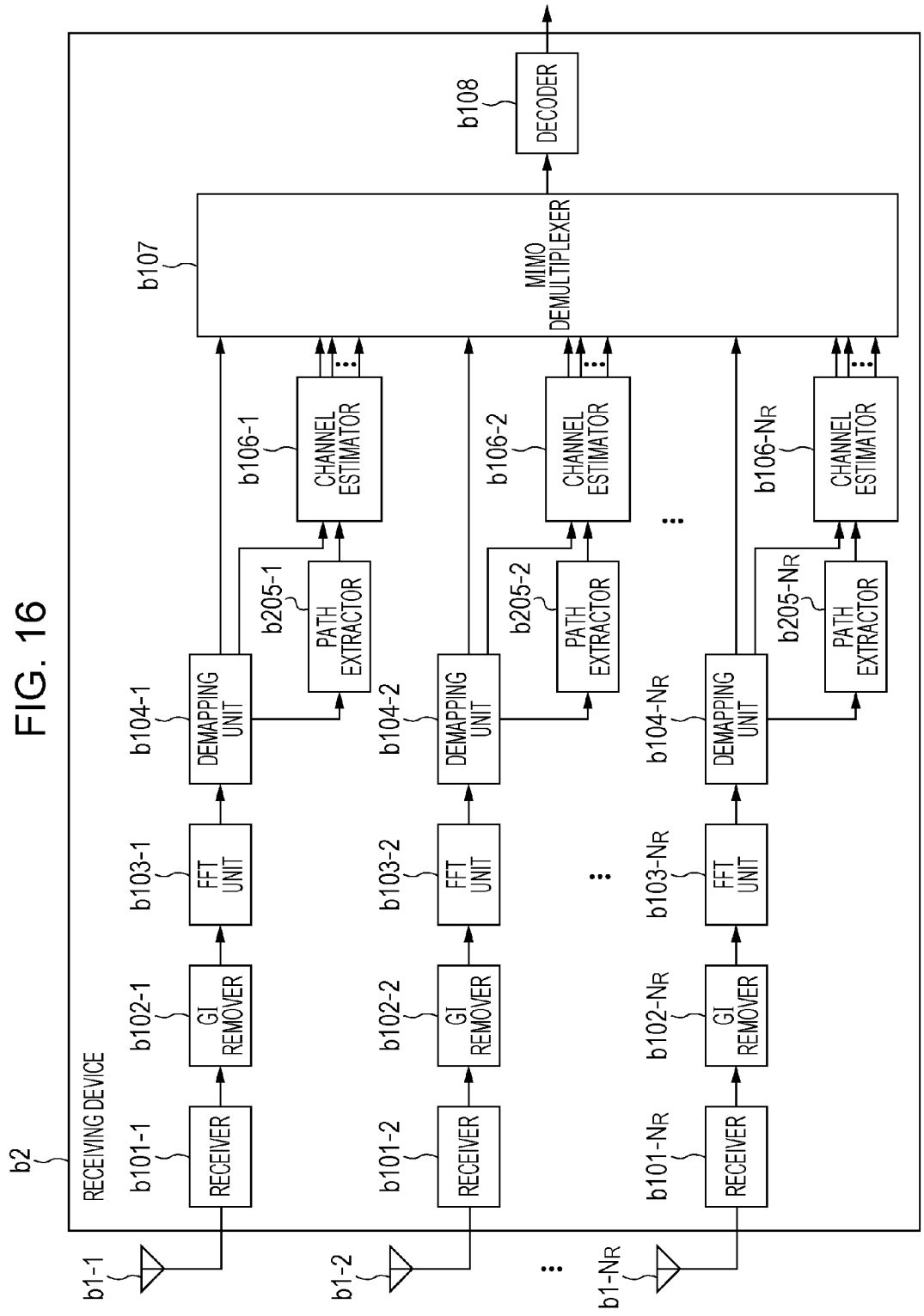
FIG. 16 is a schematic block diagram illustrating a configuration of a receiving device b2 according to the second embodiment.

FIG. 16 is a schematic block diagram illustrating a configuration of a receiving device b2 according to the present embodiment. When comparing the receiving device b2 of FIG. 16 to the receiving device b1 of FIG. 7, the path extractors b205-$n_R$ are different. However, the operations performed by the other functions (receivers b101-$n_R$, GI removers b102-$n_R$, FFT units b103-$n_R$, demapping units b104-$n_R$, channel estimators b106-$n_R$, MIMO demultiplexer b107, and decoder b108) are the same as the receiving device b1. Description of operations that are the same as the first embodiment will be reduced or omitted.

Figure 17:
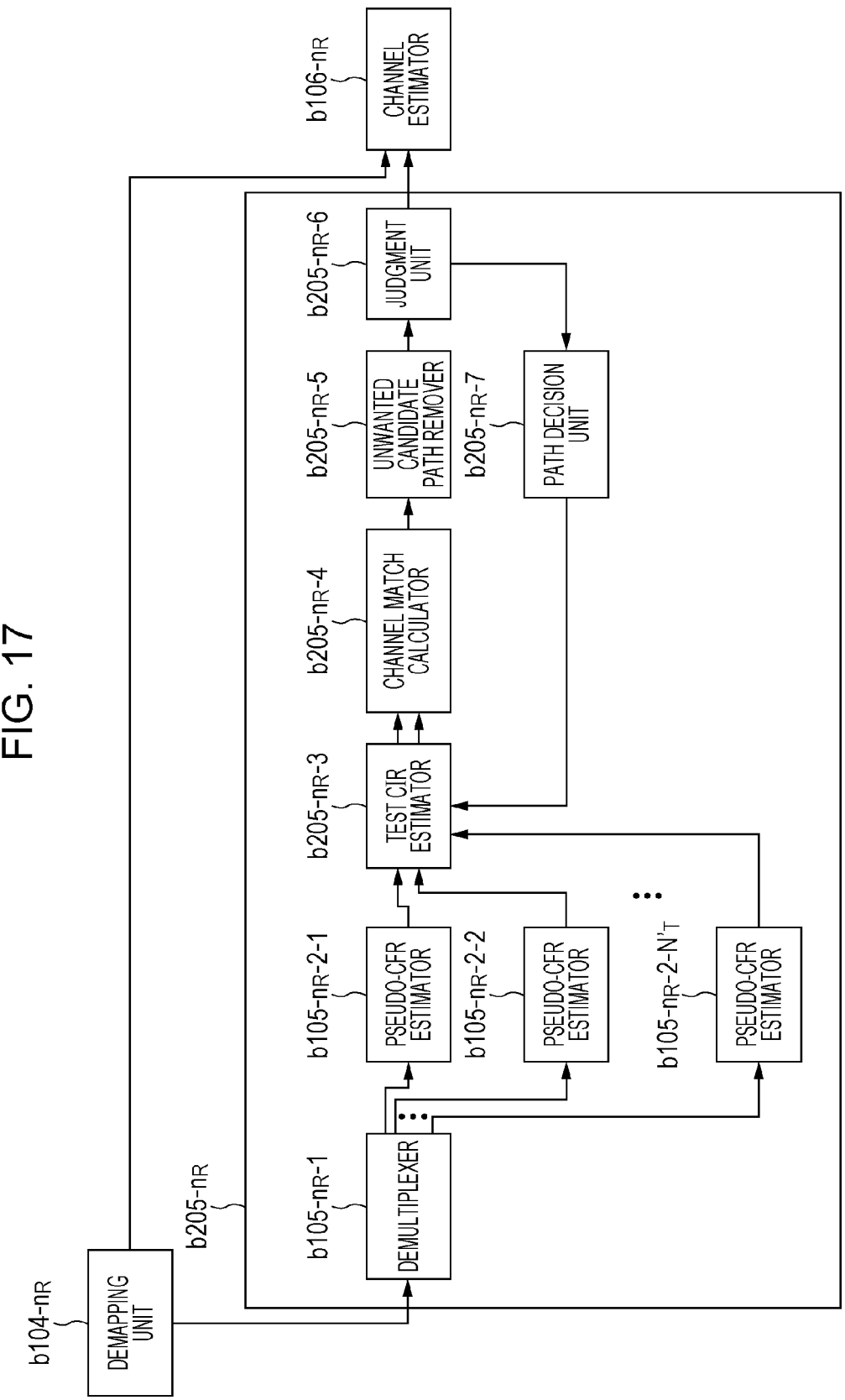
FIG. 17 is a schematic block diagram illustrating a configuration of a path extractor b205-nR.

FIG. 17 is a schematic block diagram illustrating a configuration of a path extractor b205-$n_R$. When comparing the path extractor b205-$n_R$ of FIG. 17 to the path extractor b105-$n_R$ of FIG. 8, the IFFT units b105-$n_R$-3-$n'_T$, the path location extractors b105-$n_R$-4-$n'_T$, and the path location integrator b105-$n_R$-5 are not provided, whereas a test CIR estimator b205-$n_R$-3, a channel match calculator b205-$n_R$-4, an unwanted candidate path remover b205-$n_R$-5, a judgment unit b205-$n_R$-6, and a path decision unit b205-$n_R$-7 are provided. However, the operations performed by the other functions (the demultiplexer b105-$n_R$-1 and the pseudo-CFR estimators b105-$n_R$-2-$n'_T$) are the same as the path extractor b105-$n_R$. Description of operations that are the same as the path extractor b105-$n_R$ will be reduced or omitted.

In addition, the path extractor b105-$n_R$ is equipped with a primary storage location (not illustrated for the sake of readability of the diagram), and stores a selected path (selected_path), candidate path (candidate_path), previous channel match (channel_match_prev), and channel match (channel_match).

The test CIR estimator b205-$n_R$-3 computes CIR estimation values in the case of adding one candidate_path element to the paths saved in selected_path, by using the pseudo-CFR estimation values input from the pseudo-CFR estimators b105-$n$R-2-$n'_T$. In other words, CIR estimation is conducted a number of times equal to the number of candidate_path elements. The computed test CIR estimation values and the pseudo-CFR estimation values used for the computation are output to the channel match calculator b205-$n_R$-4.

The channel match calculator b205-$n_R$-4 uses the pseudo-CFR estimation values input from the test CIR estimator b205-$n_R$-3 and a number of test CIR estimation values equal to the number of candidate_path elements to compute a channel match for each case, and saves each channel match in channel_match. Details of the channel match computation will be discussed later.

The channel match calculator b205-$n_R$-4 outputs the computed channel matches to the unwanted candidate path remover b205-$n_R$-5.

The unwanted candidate path remover b205-$n_R$-5 compares an input channel match to channel_match_prev, and if the former is smaller than the latter, deletes the small channel match from the contents of channel_match. Additionally, the unwanted candidate path remover b205-$n_R$-5 also deletes the candidate_path element corresponding to that small channel match. After that, the resulting candidate_path after deletion is output to the judgment unit b205-$n_R$-6.

The judgment unit b205-$n_R$-6 judges whether or not to continue the path extraction process. If the number of elements in the candidate_path input from the unwanted candidate path remover b205-$n_R$-5 has become less than a designated number, the path extraction process is ended at that point, and the path numbers saved in selected_path as well as the path numbers saved in candidate_path are output to a channel estimator b106-$n_R$ as path information. Otherwise, candidate_path is output to the path decision unit b205-$n_R$-7. Note that the designated number used at this point may be decided during the design stage of the receiving device b2, or may be updated when updating the firmware or software of the receiving device b2, for example. Particularly, in the case of taking the designated number to be 1, path extraction is conducted until candidate_path becomes null.

The path decision unit b205-$n_R$-7 selects the largest from among the channel matches saved in channel_match. The candidate_path corresponding to the selected channel match is decided as a new extraction path, and saved in selected_path. In addition, the selected channel match is saved in channel_match_prev.

<Operating Principles>

As initial values, suppose that selected_path in the primary storage location is set to null, candidate_path in the primary storage location is set to be from 0 to L, and channel_match_prev in the primary storage location is set to a small value (negative infinity, for example). Note that L is an anticipated maximum delay time, similarly to the first embodiment.

Test CIR estimation vectors $h_{q,nR,n'T}$ from the transmitting antennas $n'_T$ are estimated for the case of adding one of the paths in candidate_path to the paths saved in selected_path. Specifically, the MMSE technique of the formula (29) may be used. However, the CFR estimation vector in the formula (29) is changed to one whose elements are the pseudo-CFR estimation values obtained by the formula (33) (taken to be $H_{nR,n'T}$), and the discrete Fourier transform F in the formula (29) is changed to the definition in the formula (25). Specifically, $n_1, n_2, \ldots, n_P$ in the formula (25) is changed to the subcarrier numbers for which the pseudo-CFR is estimated by the formula (33). Also, the noise power $\sigma'^2$ in the formula (29) is changed. Specifically, referring to FIG. 4, in the case of $n'_T$=1 or 2, $0.5\sigma^2$ is used, whereas in the case of $n'_T$=3 or 4, $\sigma'^2$ is used (taken to be $\sigma_{n'_T}^2$).

$C_{v,h}$ in the formula (29) may be treated as one in the case of taking q in the formula (34) to be the result of adding one path from candidate_path to the paths saved in selected_path. At this point, the channel match b(q) of $h_{q,nR,n'T}$ is expressed like in the following formula (36).

[Math. 18]

$$b(q) = \sum_{n'_T=1}^{N'_T} \frac{(F^H H_{nR,n'T})^H h_{q,nR,n'T}}{\sigma'^2_{n'_T}} - x|q| \qquad (36)$$

Herein, |q| is the number of elements in q, or in other words the number of paths being extracted at that point. Also, the first term of the formula (36) is a valuation of the difference between the pseudo-CFR estimation values and the CIR estimation values computed for a path number of q. Specifically, the cross-correlation is used. Also, the second term represents a penalty with respect to the increase in the number of paths, in which x is a parameter that decides the magnitude of the penalty. Specifically, a value such as 2 or the natural logarithm of the number of subcarriers into which a pilot symbol is placed may be used. Note that the case of 2 is the Akaike information criterion (AIC), whereas the case of the natural logarithm of the number of subcarriers into which a pilot symbol is placed is called the Bayesian information criterion (BIC).

<Operations of Receiving Device b2>

Figure 18:
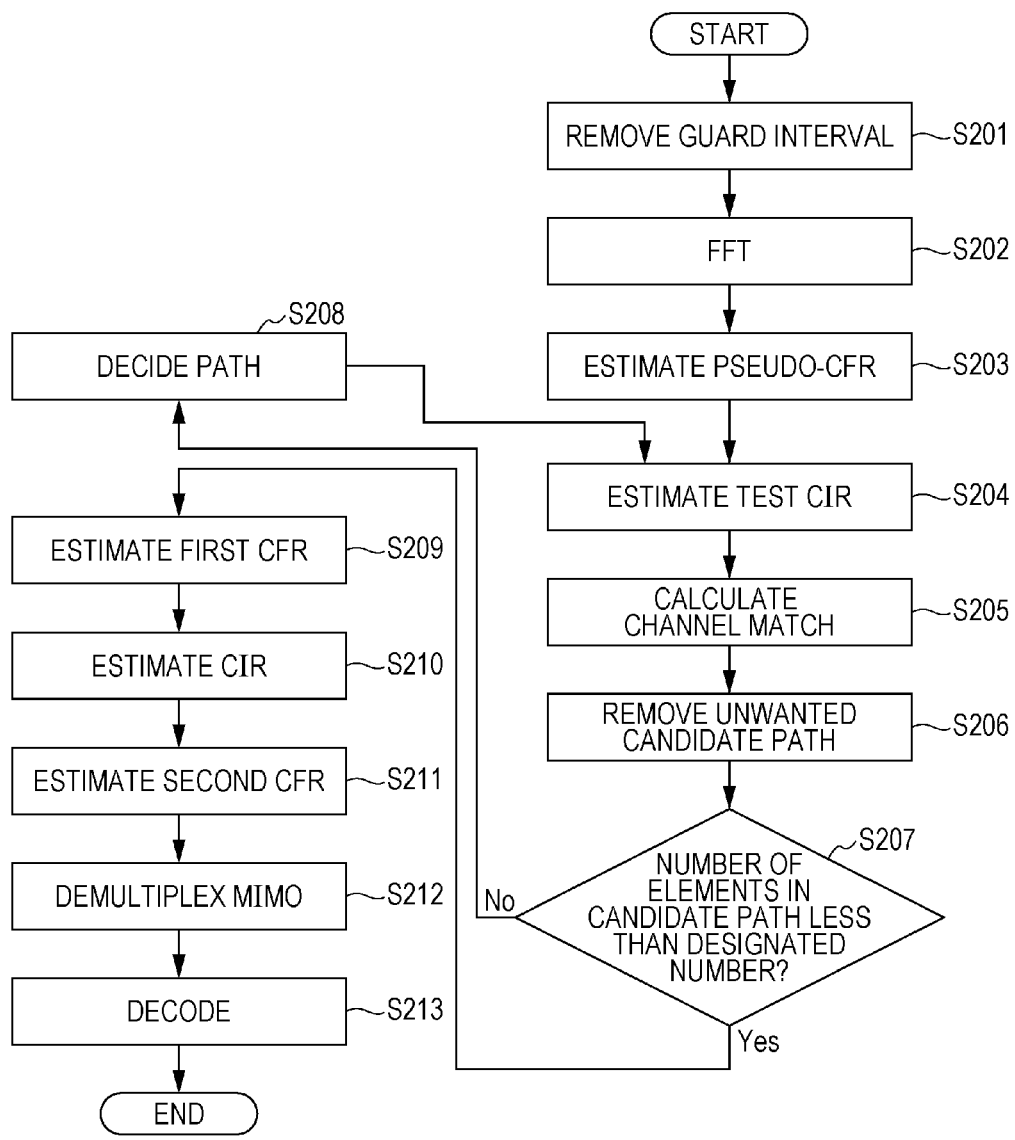
FIG. 18 is a flowchart illustrating operations of a receiving device according to the second embodiment.

FIG. 18 is a flowchart illustrating operations of a receiving device according to the present embodiment. Note that the operations illustrated in this diagram are a process after the receivers b101-$n_R$ in FIG. 16 output received signals to the GI removers b102-$n_R$.

(Step S201) The GI removers b102-$n_R$ remove the GI from the received signals. After that, the process proceeds to step S202.

(Step S202) The FFT units b103-$n_R$ apply a time-to-frequency transform to the signals obtained in step S201. The demapping units b104-$n_R$ separate from the obtained frequency-domain signals the received signals of resource elements in which data, the first pilot symbol, and the second pilot symbol were respectively transmitted. The received signals of resource elements in which data was transmitted are output to the MIMO demultiplexer b107, the received signals of resource elements in which the first pilot symbol was transmitted are output to the path extractors b205-$n_R$, and the received signals of resource elements in which the second pilot symbol was transmitted are output to the channel estimators b106-$n_R$. Additionally, the demultiplexer b105-$n_R$-1 of the path extractors b205-$n_R$ demultiplexes into each transmitting antenna the received signals of the resource elements in which the first pilot symbol was transmitted. After that, the process proceeds to step S203.

(Step S203) The pseudo-CFR estimators b105-$n_R$-2-$n'_T$ compute for each transmitting antenna pseudo-CFR estimation values in the resource elements in which the first pilot symbol was transmitted. After that, the process proceeds to step S204.

(Step S204) The test CIR estimator b205-$n_R$-3 computes test CIR estimation values for the case of adding each element of candidate_path to the path numbers saved in selected_path. After that, the process proceeds to step S205.

(Step S205) The channel match calculator b205-$n_R$-4 computes channel_match for each of the test CIR estimation values obtained in step S204 by using the pseudo-CFR estimation values obtained in step S203. After that, the process proceeds to step S206.

(Step S206) The unwanted candidate path remover b205-$n_R$-5 selects an element falling below channel_match_prev from among channel_match obtained in step S205, and deletes the candidate path element corresponding to that element. After that, the process proceeds to step S207.

(Step S207) If the number of elements in candidate path has fallen below a designated number as a result of step S206, the judgment unit b205-$n_R$-6 outputs the path numbers saved in selected_path as well as the path numbers saved in candidate_path to a channel estimator b106-$n_R$ as path information. After that, the process proceeds to step S209. If the condition is not met, the process proceeds to step S208.

(Step S208) The path decision unit b205-$n_R$-7 selects the element of candidate_path corresponding to the largest from among the elements of channel_match, and moves the selected element to selected_path. In other words, the selected path number is deleted from candidate_path. After that, the process returns to step S204.

(Step S209) The first CFR estimator b106-$n_R$-1 of the channel estimators b106-$n_R$ computes first CFR estimation values by using the received signals of resource elements in which the second pilot symbol was transmitted that were obtained in step S202. After that, the process proceeds to step S210.

(Step S210) The CIR estimators b106-$n_R$-2-$u$ compute CIR estimation values by using the path location information obtained in step S207 and the first CFR estimation values obtained in step S209. After that, the process proceeds to step S211.

(Step S211) The second CFR estimators b106-$n_R$-3-$u$ apply a time-to-frequency transform to the CIR estimation values obtained in step S210, thereby converting the CIR estimation values into second CFR estimation values. After that, the process proceeds to step S212.

(Step S212) The MIMO demultiplexer b107 conducts MIMO demultiplexing by using the received signals of resource elements in which the data was transmitted that were obtained in step S202 and the second CFR estimation values obtained in step S211, and computes the LLR of the encoded bits. After that, the process proceeds to step S213.

(Step S213) The decoder b108 conducts decoding by using the LLR of the encoded bits obtained in step S212. After that, the receiving device b2 ends the operations.

In this way, according to the present embodiment, by having a path extractor individually extract paths that improve the channel match, the extraction of unwanted paths may be prevented. For this reason, the channel estimation accuracy is improved, and by using channel estimation values with improved accuracy, the accuracy of MIMO demultiplexing may be improved.

Note that in the foregoing description of the second embodiment, a channel match is computed by using the test CIR estimation values from all transmit antennas as in the formula (36), but just one transmit antenna may also be used. As indicated in FIG. 4, since there are many pilot symbols for $n'_T=1$ and 2, the path extraction accuracy may be improved by using one of these.

Note that in the foregoing description of the second embodiment, the number of paths decided by the path decision unit b205-$n_R$-7 in one iteration of the repeating process is 1. However, this number may be increased. For example, in the case of 3, three paths are extracted in order of greatest channel match. Note that in this case, the channel match is computed for the case of adding three paths, and that channel match is saved in channel_match_prev.

Note that although the foregoing second embodiment describes a case in which the receiving device b2 is equipped with $N_R$ path extractors b205-$n_R$ as in FIG. 16, there may also be one path extractor. In this case, the path information extracted by the one path extractor is shared among all channel estimators b106-$n_R$.

(Third Embodiment)

Hereinafter, a third embodiment of the present invention will be described in detail and with reference to the drawings. In the first embodiment, a transmitting device a1 transmits a signal by mapping a first pilot symbol and a second pilot symbol in the frequency domain, while a receiving device b1 uses the first pilot symbol to extract a designated number of paths in order of highest power from among obtained pseudo-CIR estimation values. In addition, the second pilot symbol and the obtained path information is used to compute second CFR estimation values. The present embodiment describes the case of configuring continuous PDPs from the obtained path information, and computing second CFR estimation values by using a frequency correlation computable from the PDPs.

Since the configuration of a transmitting device a3 according to the present embodiment is the same as the transmitting device a1 according to the first embodiment, the description will be reduced or omitted.

Figure 19:
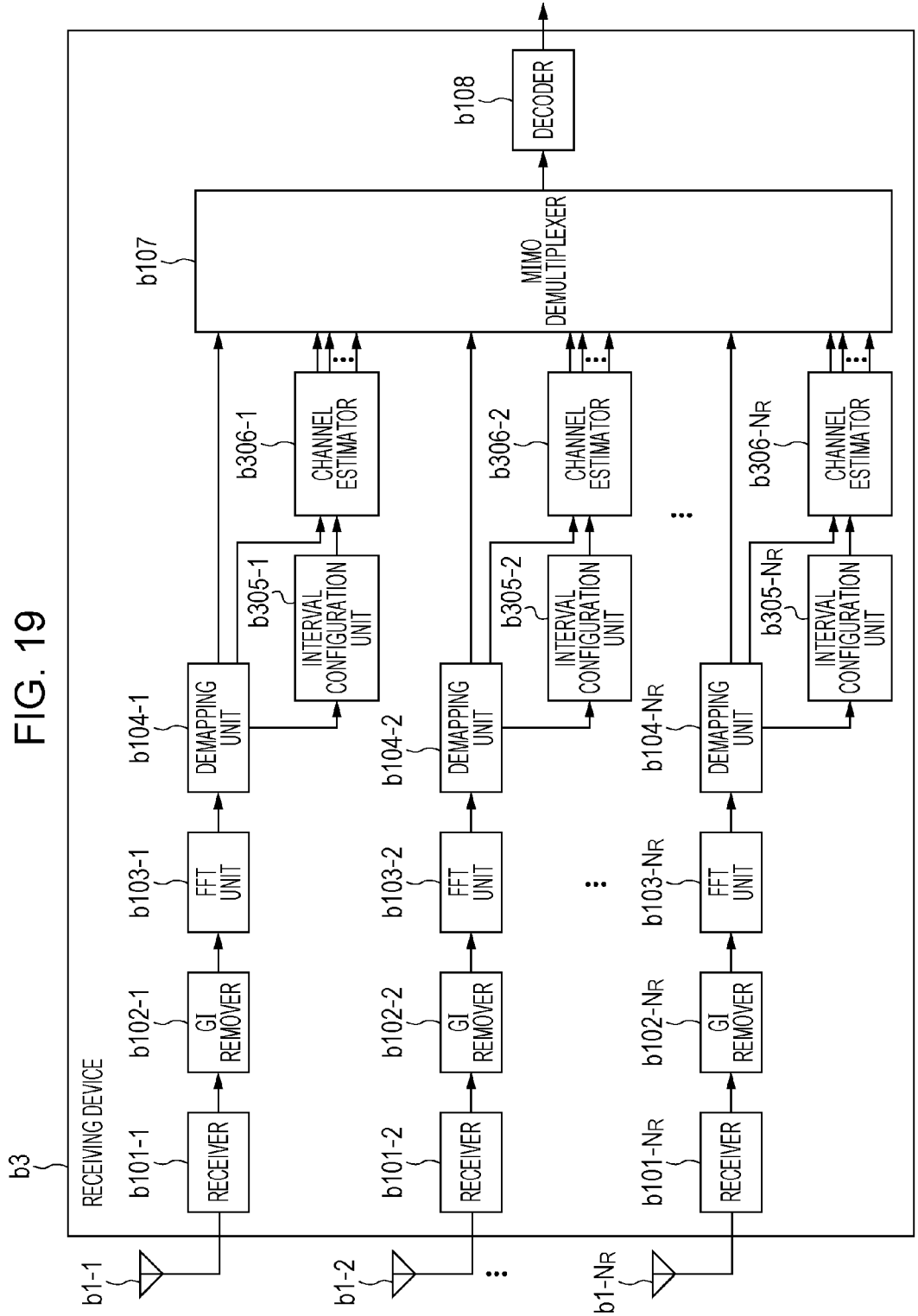
FIG. 19 is a schematic block diagram illustrating a configuration of a receiving device b3 according to the third embodiment.

FIG. 19 is a schematic block diagram illustrating a configuration of a receiving device b3 according to the present embodiment. When comparing the receiving device b3 of FIG. 19 to the receiving device b1 of FIG. 7, interval configuration units b305-$n_R$ are provided instead of the path extractors b105-$n_R$, and the channel estimators b306-$n_R$ are different. However, the operations performed by the other functions (receivers b101-$n_R$, GI removers b102-$n_R$, FFT units b103-$n_R$, demapping units b104-$n_R$, MIMO demultiplexer b107, and decoder b108) are the same as the receiving device b1. Description of operations that are the same as the first embodiment will be reduced or omitted.

Figure 20:
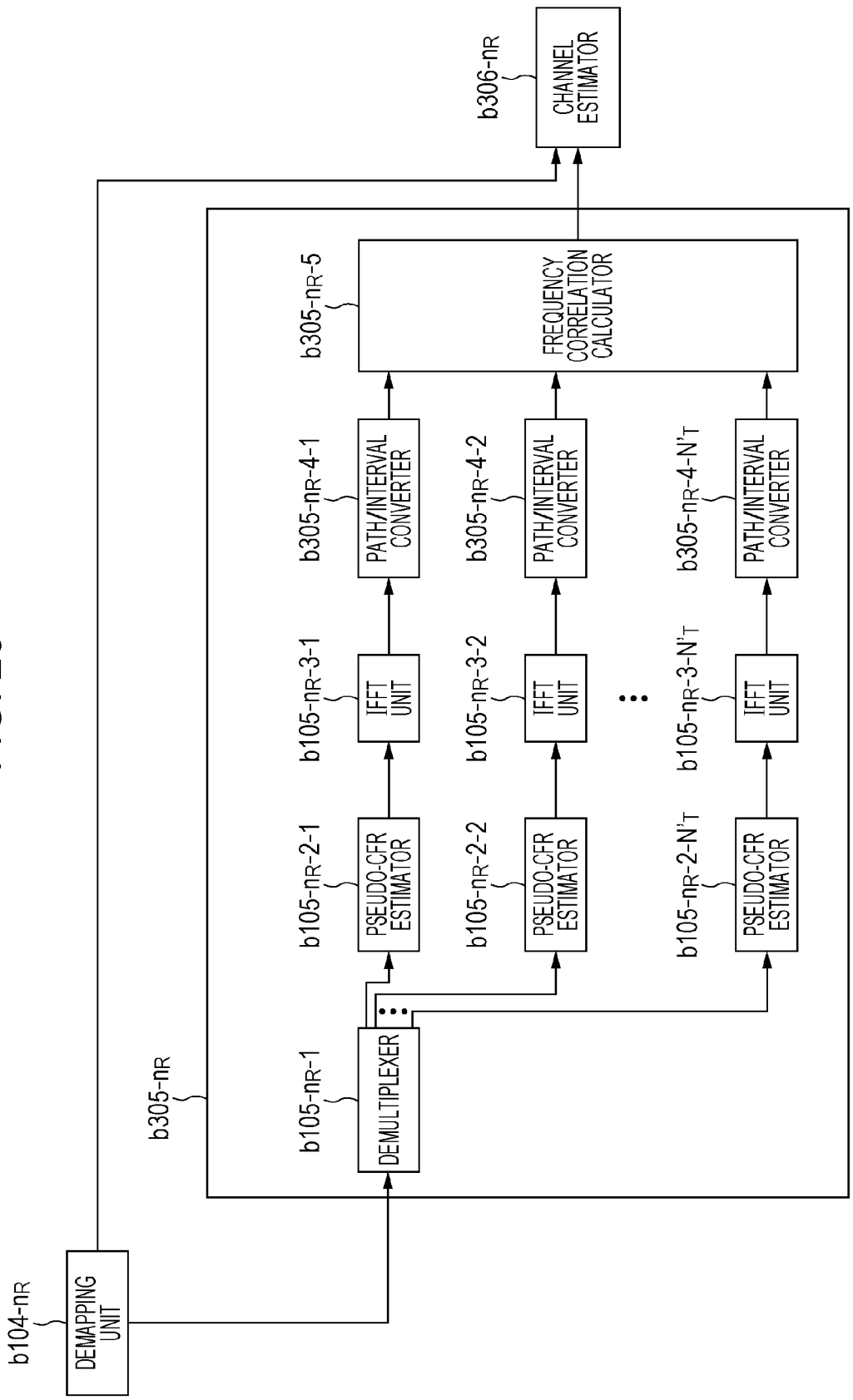
FIG. 20 is a schematic block diagram illustrating a configuration of an interval configuration unit b305-nR.

FIG. 20 is a schematic block diagram illustrating a configuration of an interval configuration unit b305-$n_R$. When comparing the interval configuration unit b305-$n_R$ of FIG. 20 to the path extractor b105-$n_R$ of FIG. 8, the path location extractors b105-$n_R$-4-$n'_T$ and the path location integrator b105-$n_R$-5 are not provided, whereas path/interval converters b305-$n_R$-4-$n'_T$ and a frequency correlation calculator b305-$n_R$-5 are provided. However, the operations performed by the other functions (the demultiplexer b105-$n_R$-1, pseudo-CFR estimators b105-$n_R$-2-$n'_T$, and the IFFT units b105-$n_R$-3-$n'_T$) are the same as the receiving device b1. Description of operations that are the same as the first embodiment will be reduced or omitted.

Figure 21:
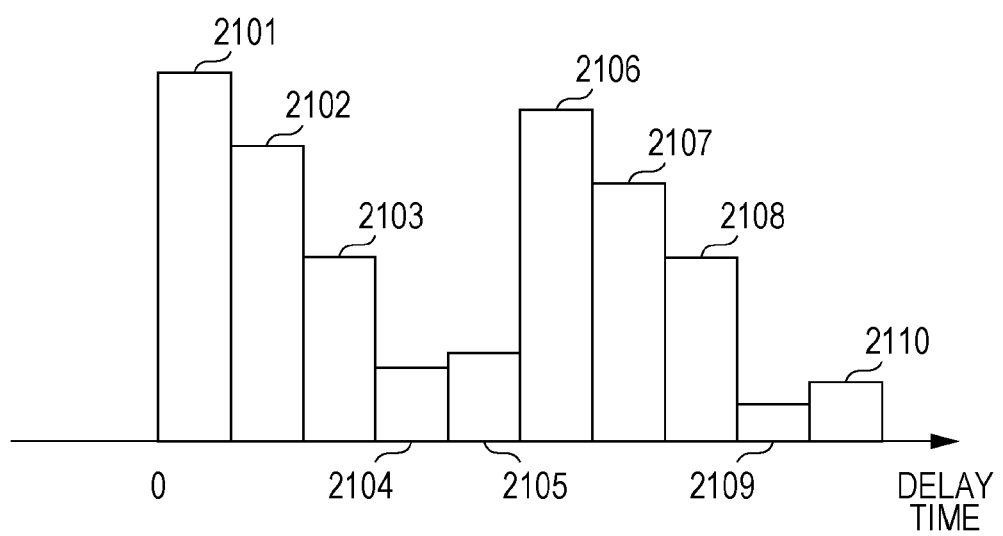
FIG. 21 is a diagram illustrating a first example of converting pseudo-CIR estimation values into continuous-valued PDPs.

The path/interval converters b305-$n_R$-4-$n'_T$ convert pseudo-CIR estimation values input from the IFFT units b105-$n$R-3-$n'_T$ into continuous-valued PDPs. Specifically, provided that the pseudo-CIR estimation values become like those of FIG. 13, the pseudo-CIR estimation values are converted like in FIG. 21. For example, the interval 2101 is converted from the path 1301. Provided that a is the power of the path 1301, the height of the interval 2101 is set to a/$\Delta_t$, and the width of the interval 2101 becomes $\Delta_t$. The PDPs obtained in this way is output to the frequency correlation calculator b305-$n_R$-5.

The frequency correlation calculator b305-$n_R$-5 first averages the PDPs input from the path/interval converters b305-$n_R$-4-$n'_T$. After that, a frequency correlation is computed from the averaged PDP, and output to a channel estimator b306-$n_R$. A method of computing the frequency correlation will be later discussed in detail.

Figure 22:
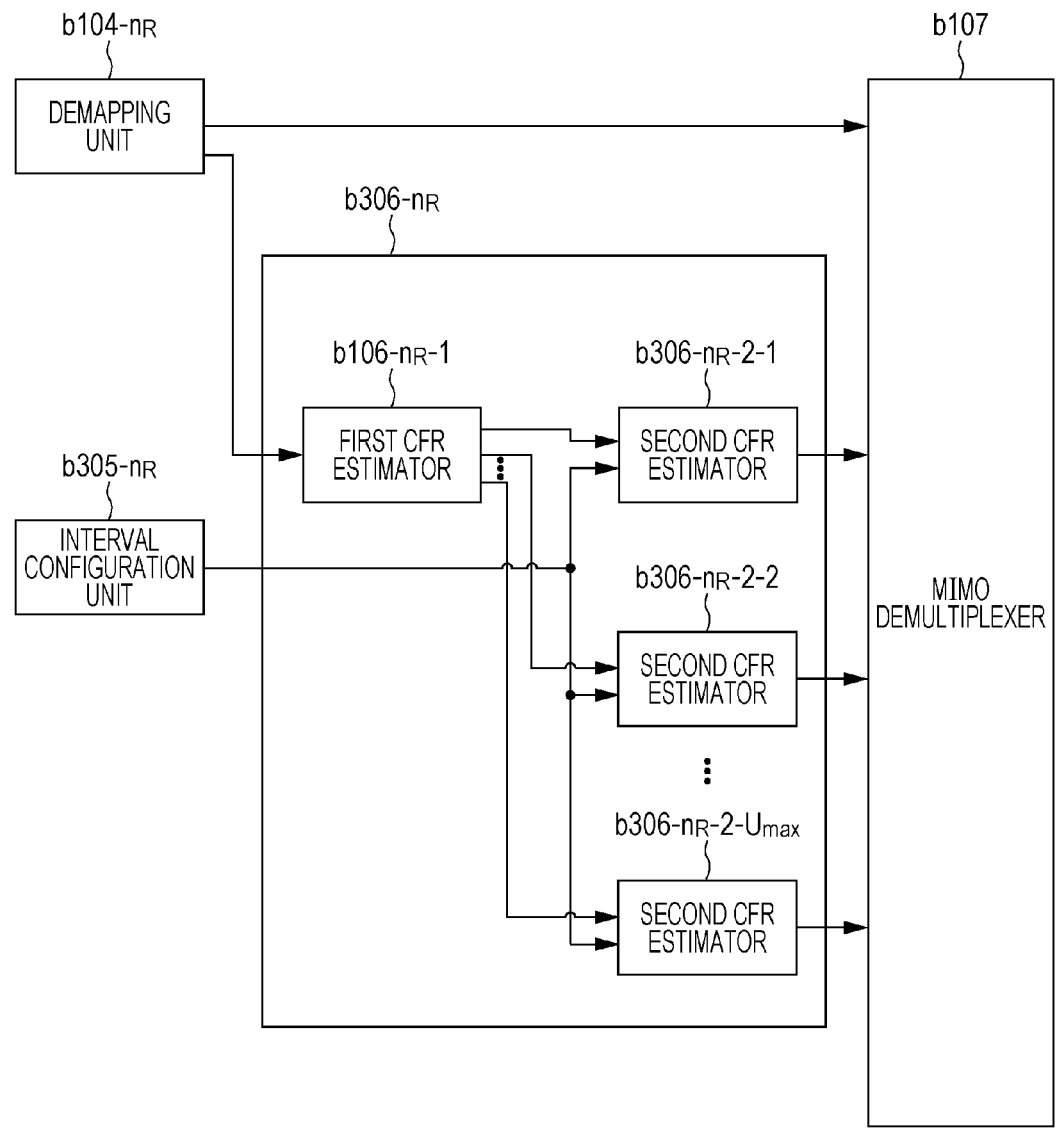
FIG. 22 is a schematic block diagram illustrating a configuration of a channel estimator b306-nR.

FIG. 22 is a schematic block diagram illustrating a configuration of a channel estimator b306-$n_R$. When comparing the channel estimator b306-$n_R$ of FIG. 22 to the channel estimator b106-$n_R$ of FIG. 9, the operation of the first CFR estimator b106-$n_R$-1 is the same, and thus the description will be reduced or omitted.

The second CFR estimators b306-$n_R$-2-$u$ compute second CFR estimation values from the first CFR estimation values input from the first CFR estimator b106-$n_R$-1 and the value of the frequency correlation input from the frequency correlation calculator b305-$n_R$-5, and outputs to the MIMO demultiplexer b107.

<Operating Principles>

Similarly to the description of the first embodiment, first a method of computing the second CFR estimation values will be described, and a method of computing a frequency correlation required as part of the method of computing the second CFR estimation values will be described.

The second CFR estimation vector H"$_{v,nR,u}$ that was computed by the formula (31) in the first embodiment is expressed like in the following formulas (37) to (39).

[Math. 19]

$$H''_{v,n_R,u} = R_{full,pilot}(R_{pilot,pilot} + \sigma'^2 I_P)^{-1} H'_{v,n_R,u} \qquad (37)$$

$$R_{full,pilot} = \begin{pmatrix} \rho_{0,n_1} & \rho_{0,n_2} & \cdots & \rho_{0,n_P} \\ \rho_{1,n_1} & \rho_{1,n_2} & \cdots & \rho_{1,n_P} \\ \vdots & \vdots & \ddots & \vdots \\ \rho_{N-1,n_1} & \rho_{N-1,n_2} & \cdots & \rho_{N-1,n_P} \end{pmatrix} \qquad (38)$$

$$R_{pilot,pilot} = \begin{pmatrix} \rho_{n_1,n_1} & \rho_{n_1,n_2} & \cdots & \rho_{n_1,n_P} \\ \rho_{n_2,n_1} & \rho_{n_2,n_2} & \cdots & \rho_{n_2,n_P} \\ \vdots & \vdots & \ddots & \vdots \\ \rho_{n_P,n_1} & \rho_{n_P,n_2} & \cdots & \rho_{n_P,n_P} \end{pmatrix} \qquad (39)$$

Herein, H'$_{v,nR,u}$ are the first CFR estimation values similar to the first embodiment, while $\rho_{n,m}$ is the frequency correlation between the subcarriers n and m. Provided that C($\tau$) is the PDP taking the delay time $\tau$ as the horizontal axis, $\rho_{n,m}$ becomes like the following formula (40).

[Math. 20]

$$\rho_{n,m} \int_0^D C(\tau) \exp[-j2\pi(n-m)\Delta_f \tau] d\tau \qquad (40)$$

The frequency correlation $\rho_{n,m}$ is input by an interval configuration unit.

Next, the computation method of the formula (40) will be described. As described using FIG. 21, in the present embodiment, pseudo-CIR estimation values are computed as in FIG. 13, and are then converted to PDPs like in FIG. 21. By substituting these PDPs into C($\tau$), the calculation in the formula (40) is conducted.

<Operations of Receiving Device b3>

FIG. 23 is a flowchart illustrating operations of a receiving device according to the present embodiment. Note that the operations illustrated in this diagram are a process after the receivers b101-$n_R$ in FIG. 19 output received signals to the GI removers b102-$n_R$.

(Step S301) The GI removers b102-$n_R$ remove the GI from the received signals. After that, the process proceeds to step S302.

(Step S302) The FFT units b103-$n_R$ apply a time-to-frequency transform to the signals obtained in step S301. The demapping units b104-$n_R$ separate from the obtained frequency-domain signals the received signals of resource elements in which data, the first pilot symbol, and the second pilot symbol were respectively transmitted. The received signals of resource elements in which data was transmitted are output to the MIMO demultiplexer b107, the received signals of resource elements in which the first pilot symbol was transmitted are output to the interval configuration units b305-$n_R$, and the received signals of resource elements in which the second pilot symbol was transmitted are output to the channel estimators b306-$n_R$. Additionally, the demultiplexer b105-$n_R$-1 of the interval configuration units b305-$n_R$ demultiplexes into each transmitting antenna the received signals of the resource elements in which the first pilot symbol was transmitted. After that, the process proceeds to step S303.

(Step S303) The pseudo-CFR estimators b105-$n_R$-2-$n'_T$ compute for each transmitting antenna pseudo-CFR estimation values in the resource elements in which the first pilot symbol was transmitted. After that, the process proceeds to step S304.

(Step S304) The IFFT units b105-$n_R$-3-$n'_T$ apply a frequency-to-time transform to the pseudo-CFR estimation values obtained in step S303, thereby converting the pseudo-CFR estimation values into pseudo-CIR estimation values. After that, the process proceeds to step S305.

(Step S305) The frequency correlation calculator b305-$n_R$-5 converts the pseudo-CIR estimation values obtained in step S304 into PDPs, and computes the frequency correlation from the converted PDPs. After that, the process proceeds to step S306.

(Step S306) The first CFR estimator b106-$n_R$-1 of the channel estimators b306-$n_R$ computes first CFR estimation values by using the received signals of resource elements in which the second pilot symbol was transmitted that were obtained in step S302. After that, the process proceeds to step S307.

(Step S307) The second CFR estimators b306-$n_R$-2-$u$ compute second CFR estimation values by using the frequency correlation obtained in step S305 and the first CFR estimation values obtained in step S306. After that, the process proceeds to step S308.

(Step S308) The MIMO demultiplexer b107 conducts MIMO demultiplexing by using the received signals of resource elements in which the data was transmitted that were obtained in step S302 and the second CFR estimation values obtained in step S307, and computes the LLR of the encoded bits. After that, the process proceeds to step S309.

(Step S309) The decoder b108 conducts decoding by using the LLR of the encoded bits obtained in step S308. After that, the receiving device b3 ends the operations.

In this way, according to the present embodiment, a PDP configuration unit computes pseudo-CIR estimation values using the first pilot symbol, converts the computed pseudo-CIR estimation values into PDPs, and computes a frequency correlation from the converted PDPs. In addition, the second pilot symbol is used to compute first CFR estimation values. This frequency correlation and the first CFR estimation values are used to compute second CFR estimation values. By using this technology in cases such as when the bandwidth into which is inserted the first pilot symbol is wider, the frequency correlation computation accuracy improves, and by computing second CFR estimation values using a more accurate frequency correlation, the channel estimation accuracy improves. By using more accurate channel estimation values, the accuracy of MIMO demultiplexing may be improved.

Note that in the foregoing description of the third embodiment, as indicated in FIG. 20, the frequency correlation calculator b305-$n_R$-5 computes a frequency correlation by averaging N'$_T$ varieties of PDPs input from the path/interval converters b305-$n_R$-4-$n'_T$. However, a single PDP may also be used. As indicated in FIG. 4, since there are many pilot symbols for n'$_T$=1 and 2, by using one of either n'$_T$=1 or 2, the frequency correlation computation accuracy may be improved.

Note that in the foregoing third embodiment, it is also possible to conduct the path extraction of the first embodiment or the second embodiment, reduce the number of paths, and then convert to PDPs.

Note that although the foregoing description of the first to third embodiments presupposes that MIMO demultiplexing is conducted, the demultiplexing may also not be MIMO. In the case of not using MIMO, estimated second CFR estimation values may be used for channel compensation.

Note that part of the transmitting device a1 and the receiving devices b1 to b3 in the embodiments discussed above, such as the path extractors b105-$n_R$ and the channel estimators b106-$n_R$, for example, may also be realized with a computer. In this case, a program for realizing the control functions may be recorded to a computer-readable recording medium, with the above devices being realized by causing a computer system to read and execute the program recorded on the recording medium.

Note that the "computer system" referred to herein is a computer system built into the transmitting device a1 or the receiving devices b1 to b3, and is assumed to include an OS and hardware such as peripheral devices. Furthermore, the "computer-readable recording medium" refers to a portable medium such as a flexible disk, a magneto-optical disc, ROM, or a CD-ROM, or a storage device such as a hard disk built into the computer system. Furthermore, the term "computer-readable recording medium" may also encompass media that briefly or dynamically retain the program, such as a communication line in the case of transmitting the program via a network such as the Internet or a communication channel such as a telephone line, as well as media that retain the program for a given period of time, such as volatile memory inside the computer system acting as the server or client in the above case. Moreover, the above program may be for realizing part of the functions discussed earlier, and may also realize the functions discussed earlier in combination with programs already recorded to the computer system.

In addition, all or part of the transmitting device a1 and the receiving devices b1 to b3 in the foregoing embodiments may also be realized as an integrated circuit realized by a process such as large-scale integration (LSI). The respective function blocks of the transmitting device a1 and the receiving devices b1 to b3 may be realized as individual processors, or all or part thereof may be integrated as a single processor. Furthermore, the circuit integration methodology is not limited to embedded applications and may be also be realized with special-purpose circuits, or with general-purpose processors. In addition, if progress in semiconductor technology yields integrated circuit technology that may substitute for LSI, an integrated circuit according to that technology may also be used.

The foregoing thus describes embodiments of the present invention in detail and with reference to the drawings. However, specific configurations are not limited to the foregoing, and various design modifications and the like are possible within a scope that does not depart from the principal matter of the present invention.

REFERENCE SIGNS LIST a1 transmitting device
a1-1 to a1-N$_T$ transmit antenna
b1 to b3, 101, 102, 103 receiving device
b1-1 to b1-N$_R$ receive antenna
b101-1 to b101-N$_R$ receiver
b102-1 to b102-N$_R$ GI remover
b103-1 to b103-N$_R$ FFT unit
b104-1 to b104-N$_R$ demapping unit
b105-1 to b105-N$_R$ path extractor
b106-1 to b106-N$_R$ channel estimator
b107 MIMO demultiplexer
b108 decoder
b105-$n_R$-1 demultiplexer
b105-$n_R$-2-1 to b105-$n_R$-2-N'$_T$ pseudo-CFR estimator
b105-$n_R$-3-1 to b105-$n_R$-3-N'$_T$ IFFT unit
b105-$n_R$-4-1 to b105-$n_R$-4-N'$_T$ path location extractor
b105-$n_R$-5 path location integrator
b106-$n_R$-1 first CFR estimator
b106-$n_R$-2-1 to b106-N$_R$-2-U$_{MAX}$ CIR estimator
b106-$n_R$-3-1 to b106-N$_R$-3-U$_{MAX}$ second CFR estimator
b205-1 to b205-N$_R$ path extractor
b205-$n_R$-3 test CIR estimator b205-$n_R$-4 channel match calculator
b205-$n_R$-5 unwanted candidate path remover
b205-$n_R$-6 judgment unit
b205-$n_R$-7 path decision unit
b305-1 to b305-$N_R$ interval configuration unit
b306-1 to b306-$N_R$ channel estimator
b305-$n_R$-4-1 to b305-$n_R$-4-$N'_T$ path/interval converter
b305-$n_R$-5 frequency correlation calculator
b306-$n_R$-2-1 to b306-$n_R$-2-$U_{MAX}$ second CFR estimator

The invention claimed is:

1. A receiving device characterized by receiving a second pilot symbol that is a pilot symbol used for demodulation, and a first pilot symbol that is a different pilot symbol from the second pilot symbol, comprising:
   a power delay profile configuration unit that uses the first pilot symbol to obtain a power delay profile; and
   a channel estimator that uses the power delay profile and the second pilot symbol to conduct channel estimation; wherein
   the power delay profile configuration unit operates as a path extractor that extracts an effective path to generate path information, and the channel estimator includes:
      a first frequency response estimator that uses the second pilot symbol to estimate a first frequency response, the first frequency response being a frequency response in a subcarrier in which the second pilot symbol is transmitted, and
      a channel impulse response estimator that uses the path information and the first frequency response to estimate a channel impulse response.

2. The receiving device according to claim 1, wherein the first pilot symbol and the second pilot symbol are placed into different resources.

3. The receiving device according to claim 1, wherein the first pilot symbol and the second pilot symbol have different multiplexing methods in a spatial direction.

4. The receiving device according to claim 1, wherein the first pilot symbol and the second pilot symbol are placed into different bandwidths.

5. The receiving device according to claim 1, wherein the second pilot symbol is placed into a bandwidth that is narrower that a bandwidth of the first pilot symbol.

6. The receiving device according to claim 1, wherein the second pilot symbol is subjected to precoding that is the same as for a data signal.

7. The receiving device according to claim 1, wherein the path extractor includes:
   a pseudo-frequency response estimator that uses the first pilot symbol to estimate a pseudo-frequency response, the pseudo-frequency response being a frequency response used for power delay profile measurement,
   a frequency-to-time transform unit that transforms the pseudo-frequency response to a pseudo-channel impulse response, and
   a path location extractor that extracts a designated number of paths in order of highest power from among the pseudo-channel impulse response.

8. The receiving device according to claim 1, wherein the path extractor repeats a series of processes of:
   adding a candidate path to selected paths and estimating a test channel impulse response,
   computing a channel match of the test channel impulse response,
   deleting, from among candidate paths, a candidate path for which the channel match falls below the channel match from before that candidate path was added, and
   from among the channel matches that were not deleted, selecting a designated number in order of greatest channel match, and selecting the corresponding candidate paths as new selected paths,
   wherein the series of processes is repeated until the number of candidate paths falls below a designated number.

9. The receiving device according to claim 8, wherein the path extractor uses, as the channel match, the sum between
   a valuation of error between the pseudo-frequency response and a channel estimation value in the case of adding the candidate path, and
   a penalty on an increase in the number of extracted paths.

10. The receiving device according to claim 1, wherein the channel estimator applies a time-to-frequency transform to a channel impulse response output by the channel impulse response estimator, thereby transforming the channel impulse response into a second frequency response that is a frequency response used for demodulation.

11. The receiving device according to claim 1, wherein:
   the power delay profile configuration unit operates as an interval extractor that includes the pseudo-frequency response estimator, the frequency-to-time transform unit, and
   a path/interval converter that computes a power of the pseudo-channel impulse response output by the frequency-to-time transform unit, converts that power into a power delay profile, and computes a frequency correlation, and
   the channel estimator uses the first frequency response and the frequency correlation to compute a second frequency response that is a frequency response used for demodulation.

12. A receiving method characterized by receiving a second pilot symbol that is a pilot symbol used for demodulation, and a first pilot symbol that is a different pilot symbol from the second pilot symbol, comprising:
   a power delay profile configuration step that uses the first pilot symbol to obtain a power delay profile; and
   a channel estimation step that uses the power delay profile and the second pilot symbol to conduct channel estimation; wherein
   the power delay profile configuration step operates as a path extractor that extracts an effective path to generate path information, and
   the channel estimation step includes:
      a first frequency response estimation step of using the second pilot symbol to estimate a first frequency response, the first frequency response being a frequency response in a subcarrier in which the second pilot symbol is transmitted, and
      a channel impulse response estimation step of using the path information and the first frequency response to estimate a channel impulse response.

13. A non-transitory computer-readable medium including a computer program for performing, when the computer program runs on a computer, a receiving method characterized by receiving a second pilot symbol that is a pilot symbol used for demodulation, and a first pilot symbol that is a different pilot symbol from the second pilot symbol, the method comprising:
   a power delay profile configuration step that uses the first pilot symbol to obtain a power delay profile; and
   a channel estimation step that uses the power delay profile and the second pilot symbol to conduct channel estimation; wherein the power delay profile configuration step operates as a path extractor that extracts an effective path to generate path information, and the channel estimation step includes:
- a first frequency response estimation step of using the second pilot symbol to estimate a first frequency response, the first frequency response being a frequency response in a subcarrier in which the second pilot symbol is transmitted, and
- a channel impulse response estimation step of using the path information and the first frequency response to estimate a channel impulse response.

* * * * *